United States Patent [19]
Rostrup-Nielsen et al.

[11] Patent Number: 6,109,018
[45] Date of Patent: Aug. 29, 2000

[54] ELECTRICALLY-HEATED COMBUSTION CATALYST STRUCTURE AND METHOD FOR START-UP OF A GAS TURBINE USING SAME

[75] Inventors: Thomas Rostrup-Nielsen; Ralph A. Dalla Betta, both of Mountain View, Calif.; Toru Shoji, Kanagawa, Japan; Scott A. Magno, Dublin; David K. Yee, Hayward, both of Calif.

[73] Assignees: Catalytica, Inc., Mountain View, Calif.; Tanaka Kikinzoku Kogyo K.K., Tokyo, Japan

[21] Appl. No.: 08/688,075

[22] Filed: Jul. 26, 1996

[51] Int. Cl.[7] ................... F23R 3/40; F02C 7/26
[52] U.S. Cl. .......................... 60/39.06; 60/723
[58] Field of Search ................ 60/39.06, 39.13, 60/39.141, 39.142, 723, 39.02

[56] References Cited

U.S. PATENT DOCUMENTS

| | | | |
|---|---|---|---|
| 3,928,961 | 12/1975 | Pfefferle | 60/723 |
| 4,112,675 | 9/1978 | Pillsbury et al. | 60/723 |
| 4,202,168 | 5/1980 | Acheson et al. | 60/723 |
| 4,202,169 | 5/1980 | Acheson et al. | 60/723 |
| 4,598,541 | 7/1986 | Mori et al. | 60/39.141 |
| 5,070,694 | 12/1991 | Whittenberger | 422/174 |
| 5,232,671 | 8/1993 | Brunson et al. | 422/174 |
| 5,250,489 | 10/1993 | Dalla Betta et al. | 502/262 |
| 5,437,099 | 8/1995 | Retallick et al. | 29/890 |
| 5,440,872 | 8/1995 | Pfefferle | 60/39.06 |
| 5,456,890 | 10/1995 | Tsai et al. | 422/174 |
| 5,518,697 | 5/1996 | Dalla Betta et al. | 60/723 |
| 5,632,961 | 5/1997 | Sheller | 422/180 |

FOREIGN PATENT DOCUMENTS

| | | | |
|---|---|---|---|
| 59-53034 | 2/1984 | Japan | 60/723 |
| 5-346207 | 12/1993 | Japan | 60/723 |

*Primary Examiner*—Timothy S. Thorpe
*Assistant Examiner*—Ted Kim
*Attorney, Agent, or Firm*—Al A. Jecminek

[57] ABSTRACT

This invention relates to an electrically-heated catalyst (EHC) and a start-up method of a gas turbine engine for combusting a hydrocarbonaceous fuel/oxygen-containing gas mixture using this electrically-heated catalyst. The catalytic structure is electrically heated to a predetermined temperature prior to start up of the turbine so as to reduce emissions during the start-up of the system. The EHC unit is a stacked or spirally wound layering of flat and corrugated thin metal foils which forms a plurality of axially-extending, longitudinal channels. The channels are preferably coated on one surface with a catalytic material, leaving the other surface free from the reaction to act as a heat sink, making the design an IHE (integral heat exchange) catalytic unit. The preferred embodiment of the EHC has electrodes outside of the fuel/oxygen-containing mixture stream, and uses electrical power having a predetermined voltage in the range of 100 to 200 volts to heat the unit. A method for using the EHC in the start-up of a gas turbine is also disclosed wherein an electrical power is applied to heat the EHC a predetermined temperature prior to the fuel/oxygen-containing mixture being introduced and may be left on for a certain period of time after the introduction of the fuel/oxygen-containing mixture. The EHC may be maintained at the desired predetermined temperature by modulating the applied voltage. The electrical power is terminated when any one of several conditions are met including when the heat of the catalytic reaction is sufficient to maintain the catalyst at its steady-state condition or when a certain period of time has elapsed.

9 Claims, 15 Drawing Sheets

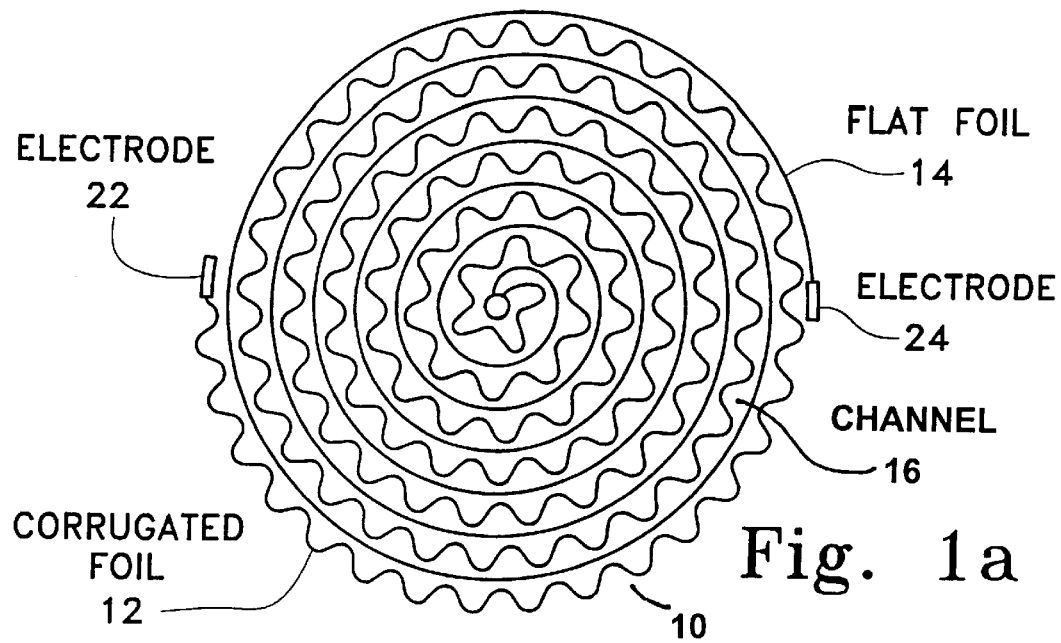
Fig. 1a
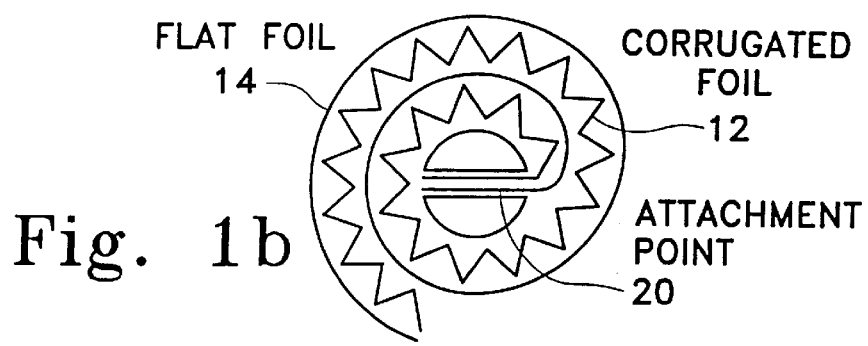
Fig. 1b
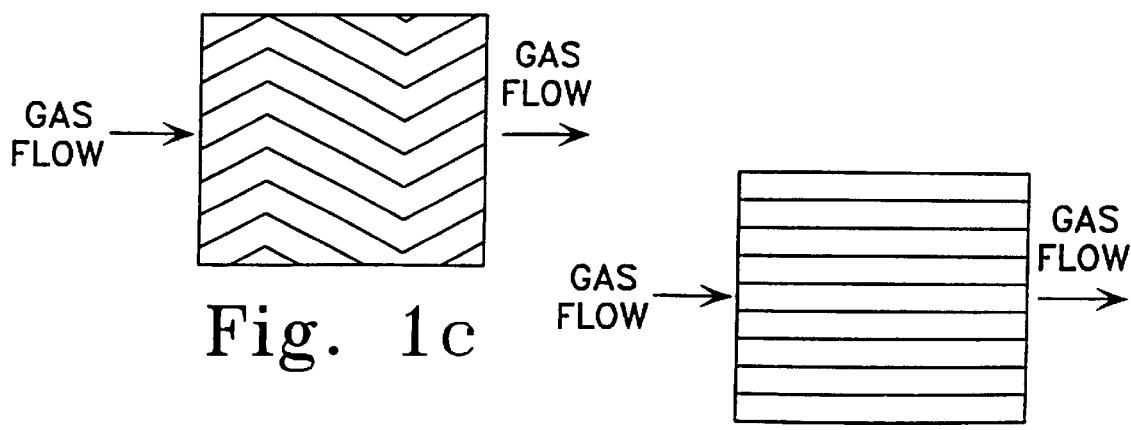
Fig. 1c
Fig. 1d

ELECTRICALLY-HEATED COMBUSTION CATALYST STRUCTURE AND METHOD FOR START-UP OF A GAS TURBINE USING SAME

BACKGROUND OF THE INVENTION

This invention relates in general to electrically-heated catalyst structures and methods for starting up a gas turbine engine. Catalytic combustion systems have been proposed for turbines or engines which burn hydrocarbonaceous fuels. The catalytic combustion systems are used to reduce the amount of uncombusted hydrocarbons and other undesirable combustion by-products such as carbon monoxide and nitrous oxides (NOx). Typically, catalytic combustion systems are quite effective in reducing the amount of these undesirable emissions once steady-state operating conditions are achieved. However, during the initial start-up of the turbine or engine, the amount of emissions may be above the desired limits.

The amounts of undesirable emissions are usually higher during start-up conditions because the catalyst is not at a temperature at which it is most effective. One method which has been used to achieve lower emissions is to more quickly bring the catalyst up to its desired operating temperature by preheating the air that is supplied with the hydrocarbonaceous fuel to the catalytic combustion system. Another way to achieve lower emissions more quickly is to preheat the catalyst.

Typically, a catalytic structure is a metallic or ceramic substrate, coated with a catalytically reactive substance and placed into a fuel/air stream. The catalysts are typically Group VIII noble metals or the platinum group metals and react with the fuel/air mixture passed over the catalyst structure. The reaction rate of the fuel/air mixture over the catalyst is temperature dependent, typically being low or non-existent at low temperatures, most efficient and controllable in a particular higher temperature range, while above certain known high temperatures the catalyst suffers deactivation and/or the reaction becomes uncontrollable. Therefore, it is important to design the catalytic structure so that it will withstand the operating temperatures of the system it is installed in, can be quickly brought up to its most efficient operating temperature range and yet, be maintained within this desired operating temperature range so as to prevent any catalytic deactivation and/or runaway reaction.

Until the catalyst reaches an ideal operating temperature range, the combustion of the fuel in the fuel air mixture is likely to be incomplete. It has been shown that by heating the catalyst structure prior to or concurrently with the introduction of the fuel/air mixture, the catalyst can be brought up to a satisfactory operating temperature range, with a concurrent increase in the amount of fuel combusted. This, in turn, leads to a reduction in the amount of emissions during the start-up period. It is known in the art to electrically heat a catalytic structure to reduce emissions during start up of a gas turbine. For example, U.S. Pat. No. 5,440,872 to Pfefferle describes a catalyst designed to lower the start up emissions of a gas turbine using a catalytic combustion system. Pfefferle '872 uses a "microlithic catalyst" with a very low mass so that heat-up occurs quickly. Pfefferle also proposes the use of electrical heating to raise the catalyst temperature prior to introducing fuel. Because the catalyst operates at the adiabatic combustion temperature of the fuel/air mixture, the system is limited to temperatures in the range of 600° K. to 1250° K. (327° C. to 977° C.). This is a low temperature limiting this technology to gas turbines with low turbine inlet temperatures. The technology of the present invention is not limited to low combustor outlet temperatures and has been demonstrated at combustion outlet temperatures as high as 1500° C.

A further example of an electrically-heated catalyst is disclosed in U.S. Pat. No. 5,070,694 to Whittenberger. Whittenberger '694 describes an electrically-heated catalytic structure comprised of alternating strips of brazing material and thin metal strips, all of which are fused to a central electrode. The foil unit is made catalytically reactive by dipping it in a bath which contains slurries of the catalytic coating, and then it is spirally wound and encased in an electrically conductive outer shell. Current is then passed from the outer shell to the center electrode to heat the structure. This device is designed for use in an automotive application and uses a voltage source in the range of 12 to 24 volts and a start-up temperature of approximately 650° C. The structure of the catalyst in whittenberger '694, in which all of the surfaces are catalytically reactive and are not insulated from one another, proscribes its use in an application using high voltages since short circuiting and uneven heating may occur in this structure. In contrast, the structure of the present invention provides insulative barriers between the current carrying members to ensure there is no short circuiting. In addition, the structure of the present invention can be operated at voltages of about 100 volts or higher with the structure being evenly heated with no damage from arcing or overheating.

The above examples of electrically-heated catalyst units have used a centrally located electrode to complete the electrical flow path. It is known that in applications using catalytic structures in gas turbines, any irregularity in the structure of the catalyst bed such as an electrode, can cause flow disruptions or irregular flow patterns leading to hot spots or even premature ignition of the fuel/air mixture and thereby destroying the structure. An electrically-heated catalytic structure that does not use a central electrode is described in U.S. Pat. No. 5,232,671 to Brunson et. al. Brunson '671 describes a spirally wound structure having two groups of catalytically reactive foils separated by an insulating barrier. Each of the foils in the separate groups is connected to one pole of the voltage source, and all the foils are connected to each other in the center of the structure. This method of connection puts each foil in parallel to the other foils, minimizing the available resistance of the foils. The foils in Brunson '671 are also connected in the center of the structure by a pin or other type of crimping device. In contrast, the technology of the present invention has the foils arranged in series with each other to maximize the available resistance. An embodiment of the present invention also provides a structure without a central supporting member such as an electrode or a pin.

U.S. Pat. No. 5,250,489 to Dalla Betta et. al. discloses a catalytic structure that is formed into a spiral shape and which has integral heat exchange. In contrast to the present invention, this disclosure is not an electrically-heated catalyst (EHC), and the disclosure does not teach or suggest any requirements regarding the electrical considerations and insulative properties required in an EHC.

SUMMARY OF THE INVENTION

This invention relates to an electrically-heated catalyst (EHC) and a start-up method of a gas turbine engine for combusting a hydrocarbonaceous fuel/oxygen-containing gas mixture using this electrically-heated catalyst. More specifically, this invention is a catalytic structure which is electrically heated to a predetermined temperature prior to start up of the turbine, or any other system it is used with, so as to reduce emissions during the start-up of the system. In one preferred embodiment of the invention, the electrical power may be maintained for a certain period of time after the fuel/oxygen containing mixture is introduced.

In general, the electrically-heated catalyst structure of the present invention is comprised of at least two heat resistant, thin metal foil strips that are corrugated or corrugated and flat. These foils are attached to each other at an attachment point and the two foils are stacked one on top of the other. In a preferred embodiment, the two foils are wound together starting at the attachment point so as to form a spiral structure. In an alternative embodiment, at least one set of the stacked foils, or more preferably, a plurality of the foil sets, comprise the catalyst structure. In both embodiments, the foils are stacked together such that a plurality of adjacent longitudinal channels are formed for receiving and passing the fuel/oxygen-containing gas mixture through the catalyst structure. At least some portion of the foils have an electrically insulative coating on at least some portion of the foil surfaces. In addition, a combustion catalyst is coated on at least one side of a portion of the foils such that at least a portion of the longitudinal channels have at least a portion of their surface coated with the catalyst. Coating only a portion of the channel surfaces with catalyst provides for integral heat exchange in which the heat of the catalytic reaction is transferred through both conduction and convection to both the catalytically reacting gas streams and to the non-reacting gas streams.

The catalyst structure is electrically heated by attaching two electrodes to the catalyst structure and by connecting these electrodes to a source of electrical power. In one preferred embodiment of the invention, the ends of the two foils making up the structure which are not attached together at the attachment point are located at the periphery of the spiral structure and electrodes attached to the foils and connected to the electrical power. Upon application of the electrical power, a current will flow through some portion of foils from the first electrode to the second electrode, thereby heating the foils. In an alternative embodiment, a center electrode is attached at the attachment point of the two foils and one or more electrodes are attached to the foils at the periphery of the catalyst structure. Either a series or parallel circuit design can be employed in either embodiment, however, the series circuit design is preferred.

Another aspect of the invention relates to a method of starting up a gas turbine engine, employing an electrically-heated catalyst structure such as that described above to affect combustion of the hydrocarbonaceous fuel/oxygen-containing gas mixture used to power the turbine, whereby the amount of unburned hydrocarbons and carbon monoxide emissions are minimized and runaway catalytic reactions and catalyst decomposition is avoided. In this aspect of the invention electrical power is first applied to the electrically-heated catalyst structure to preheat the catalyst to within about 100° C. of the steady-state operating temperature of the catalyst structure in combusting the fuel/oxygen-containing gas mixture, at which point the preheated catalyst structure is contacted with the fuel/oxygen-containing gas mixture to initiate the combustion reaction and the electrical power heating the catalyst structure is then turned off when any of the following conditions are met:

(i) the heat of reaction released by the reaction of the fuel and oxygen on said catalyst structure is sufficient to maintain said catalyst structure at its steady-state operating temperature, or (ii) the fuel/oxygen-containing mixture at the combustor outlet reaches a predetermined temperature limit, or (iii) a predetermined period of time has elapsed since said contacting step was initiated, or (iv) the partially combusted fuel and oxygen-containing mixture at the catalyst exit reaches a predetermined temperature.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1a is a front, edge-on drawing of a spiral wound electrically-heated catalyst (EHC) unit of the present invention.

FIG. 1b is a detail drawing of the attachment point of a flat foil and a corrugated foil at the center of the EHC unit.

FIGS. 1c and 1d are side views of a herringbone and straight corrugation types, respectively.

DETAILED DESCRIPTION OF THE PREFERRED EMBODIMENT

Figure 2:
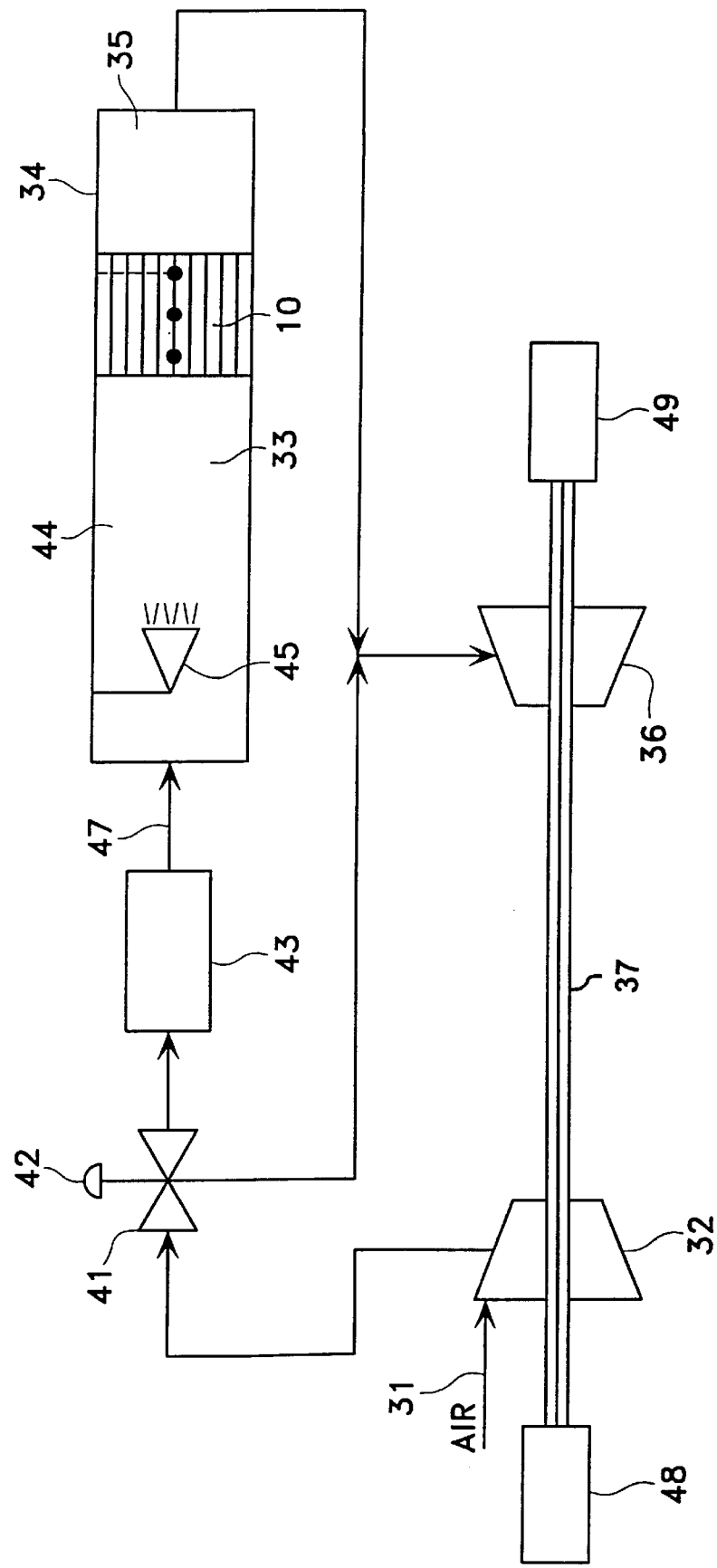
FIG. 2 is a block diagram of gas turbine engine.

Referring now to the drawings, there is illustrated in FIG. 1a an electrically-heated catalyst (EHC) combustion structure or unit 10 in accordance with the present invention. As seen from FIG. 1a, the EHC unit 10 of the present invention is a generally cylindrical, monolithic structure comprised of an electrically-heated and electrically-conducting catalyst support and a combustion catalyst. In one embodiment, the structure is wound or otherwise assembled into a spiral such that the combusting gas mixture flows through a plurality of longitudinally extending channels. Electrodes are connected to the catalyst support and an electrical voltage is applied causing resistive (joule) heating of the catalyst structure. A catalytic material is placed on only a portion of the longitudinally-extending channels which allows the heat being produced on the catalyst-coated surfaces to be transferred via integral heat exchange through the catalyst support to the gas mixture flowing through adjacent channels.

In general, the design of an EHC combustion structure is concerned with four major criteria: 1) the physical geometry and dimensions of the structure; 2) the electrically-heated portion of the structure; 3) the catalytic portion of the structure; and 4) the heat transfer portion of the structure. Prior to discussing the details of these four criteria, it is important to understand the systems in which such an electrically-heated catalytic combustion structure is used.

One type of system that an EHC can be used in is the gas turbine engine. Referring to FIG. 2, there is shown a combustion gas turbine comprised generally of a compressor 32, a catalytic combustion chamber 34, and a turbine 36. Outside air 31 is supplied to the compressor 32 which produces compressed air having a predetermined higher pressure and higher temperature. The compressed air is passed through a bypass valve 41 which is actuated by any suitable actuator 42 such as a solenoid or a pneumatic actuator. Normally, the bypass valve 41 is set to control the amount of air directed to the catalytic combustion chamber 34 to control the operating conditions in this combustion chamber to the within the desired operating regions. The air preheating section 43 is used during start up of the gas turbine to obtain the required inlet temperature to vaporize the liquid fuel and to be within the combustor operating windows, typically 200 to 400° C. Heat may be provided in this preheating section 43 by electrical resistive (joule) heating. Normally, this preheating section 43 will be placed in service when the gas turbine is initially started. During other operating conditions, the preheating section 43 may not be in use. Next, the compressed air is mixed with a suitable hydrocarbonaceous fuel in a fuel mixing section 44. A fuel spray nozzle 45 is used for supplying the hydrocarbonaceous fuel to the inlet of the fuel mixing section 44. After uniform mixing of the hydrocarbonaceous fuel and air, it is passed to the catalyst 10 which is electrically heated in accordance with the present invention. After the compressed air and hydrocarbonaceous fuel have reacted together in the presence of the catalyst, the resulting higher temperature and pressure combustion-products gas mixture is passed to the turbine 36 where the energy of this gas is converted into rotational energy of the turbine shaft 37. The rotational energy of the turbine shaft 37 is used to drive the compressor 32 as well as any other output device such as a generator 49. A starter motor 48 can also be connected to shaft 37 to start the gas turbine.

Typically, a gas turbine engine having an EHC unit 10 is used in industrial applications for reducing the emissions resulting from the process of converting hydrocarbonaceous fuels into energy. However, an EHC unit 10 could also be designed for use in non-industrial applications, such as for use in automotive vehicles. Emissions from automotive vehicles are now also receiving heightened scrutiny as a source of pollution. Therefore, the use of an EHC unit 10 according to the present invention in an automotive application would be advantageous and effective. Regardless of the type of application an EHC is used, the following four design criteria must be considered.

The Physical Geometry and Dimensions of the EHC Structure

Referring to FIG. 1a, the EHC of the present invention is shown generally at 10. In this Figure, the EHC unit is shown as composed of a flat foil 14 and a corrugated foil 12.

To form the EHC unit 10, the flat foil 14 and the corrugated foil 12 are stacked one on top of the other, joined together along one edge at the attachment point 20, as shown if FIG. 1b and wound into a spiral shape. In general, the EHC can be formed from any set non-nesting foils, either flat and corrugated or both corrugated such that when stacked together the corrugations do not nest but form well defined longitudinal channels.

The foils can be wound in a variety of ways, depending upon the desired shape and application in which the EHC unit 10 is to be used. Generally, the attachment point 20 will be at the center of the catalytic structure 10. FIG. 1b shows a detail of the attachment point 20 when at the center of the catalytic structure. Conventional methods including, but not limited to, welding, brazing and crimping can be used for joining the corrugated foil 12 and the flat foil 14 together. Alternatively, the two foils can be joined together by inserting adjacent ends of the corrugated foil 12 and the flat foil 14 in a longitudinally-extending slot formed in a cylindrical rod (not shown). The joined foils are then wound around the rod to form a cylindrical, monolithic structure. In general, the key requirement of any attachment or joining method is to connect the two foils in a manner which allows current to flow in series or in parallel between the two foils. In addition, the attachment procedure should include good manufacturing practices such as surface preparation of the foils, e.g., by sandblasting to ensure a solid connection.

When the flat foil 14 and the corrugated foil 12 are placed together, and wound into a spiral shape as shown in FIG. 1a, a plurality of channels are thereby formed which extend longitudinally (or axially) with respect to the axis of the EHC unit 10, and along the whole length of the EHC unit 10. The selection of the corrugation pattern determines the shape and size of the opening of each air channel 16. The shape of the corrugation also determines the air flow pattern in each channel 16. Two typical shapes of corrugations include a herringbone pattern and a straight corrugation, which are shown from the top view in FIGS. 1c and 1d, respectively. These corrugation types can be combined in a variety of combinations to form the EHC unit by stacking the foil together in a straight layered structure or by stacking two or more foils and then winding into a spiral to form the EHC unit. Since a great amount of heat is generated in a catalytic reaction, it is important the have turbulent air flow in the channels, and the corrugations should be designed to account for this need. The surface area of the corrugated foil 12 may also determine the amount of catalytically reactive substance present in the EHC unit 10 if the catalyst is deposited on the corrugated foil 12. Therefore, the corrugations should also be designed with this in mind.

In general, the corrugations should occur at least twice per circumferential pass on a spiral wound catalytic structure, with the size of the channel openings 16 and the overall length determined by structural stability considerations and the type of application in which the EHC is used. The size of the channel openings 16 is a function of the corrugation height and peak-to-peak distance of the corrugated foil 12. For example, for an EHC used in a gas turbine having a power output of about 30 kW the EHC unit would have a diameter of 50 mm to 150 mm and length of 50 to 200 mm and the corrugation height should range from about 0.8 mm to 1.6 mm while the peak-to-peak distance should range from about 1 mm to about 3 mm. If a herringbone pattern is used, the channel length of each straight section of the corrugated should range from about 10 to 30 mm and these patterns should have a channel angle of about 3° to 20°. As an example only, a corrugated foil 12 having a herringbone pattern with channel lengths of 20 mm and a channel angle of 6° could be used. This herringbone pattern would also have a corrugation height of 1.20 mm and a peak-to-peak period of 2 mm. In a straight corrugation pattern, the corrugation height would also be 1.2 mm with a peak-to-peak period of 2 mm.

As an alternative embodiment to the spiral wound EHC unit 10, one or more sets of foils could be stacked together to form the EHC unit 10. In addition, although only the herringbone and straight types of corrugation shapes having specific sizes have been discussed, it is envisioned that other shapes of corrugations of differing sizes can be used in making the EHC unit 10 of the present invention. In particular, corrugated foils can be stacked together to form an asymmetric structure such as those described by Dalla Betta et. al. in U.S. Pat. No. 5,512,250 in which the tortuosity of the catalytically coated channels is different then the tortuosity of the non-catalyst-coated channels. The structures of '250 patent are incorporated herein by reference.

Electrical Design Considerations

To provide the electrically heated function of the EHC unit 10, the flat foil 14 and the corrugated foil 12 must be made from a material which is electrically conductive, usually a ceramic or metallic material, and which can also withstand the operating temperatures of the catalytic unit 10. A metallic material is the preferred material. Specific types of metallic alloys include, but are not limited to, iron/chromium/aluminum (Fe/Cr/Al), nickel/chromium/aluminum (Ni/Cr/Al), or any alloy containing aluminum. In the preferred embodiment, an aluminum-containing alloy is used and more preferably, a (Fe/Cr/Al) alloy containing 10 to 20% Cr (by weight) and 5 to 10% Al (by weight or a (Ni/Cr/Al) alloy containing 10 to 20% Cr (by eight) and 5 to 10% Al is used.

As noted previously, the corrugated foil 12 and flat foil 14 are joined together along one edge in a manner that will allow electrical current to pass unimpeded from one foil to the other, such as by brazing, welding, crimping, etc. The location of the attachment point 20 can best be seen by referring to FIG. 1b. The joined edges are placed at the center of the spiral, leaving two free edges at the periphery of the structure when corrugated foil 12 and flat foil 14 are wound together. Although in the preferred embodiment, corrugated foil 12 and flat foil 14 are of the same dimensions and alloy, it is envisioned that many different shapes and alloys could be used.

Winding flat foil 14 and corrugated foil 12 together with attachment point 20 in the center of the structure results in the unattached end of corrugated foil 12 and flat foil 14 at the outer periphery of the EHC unit 10. The end of the foils may be located anywhere on the periphery. FIG. 1a illustrates a preferred location with the ends diametrically opposed. Separation of the ends of the foils is generally desired to minimize shorting across the electrodes.

Figure 3:
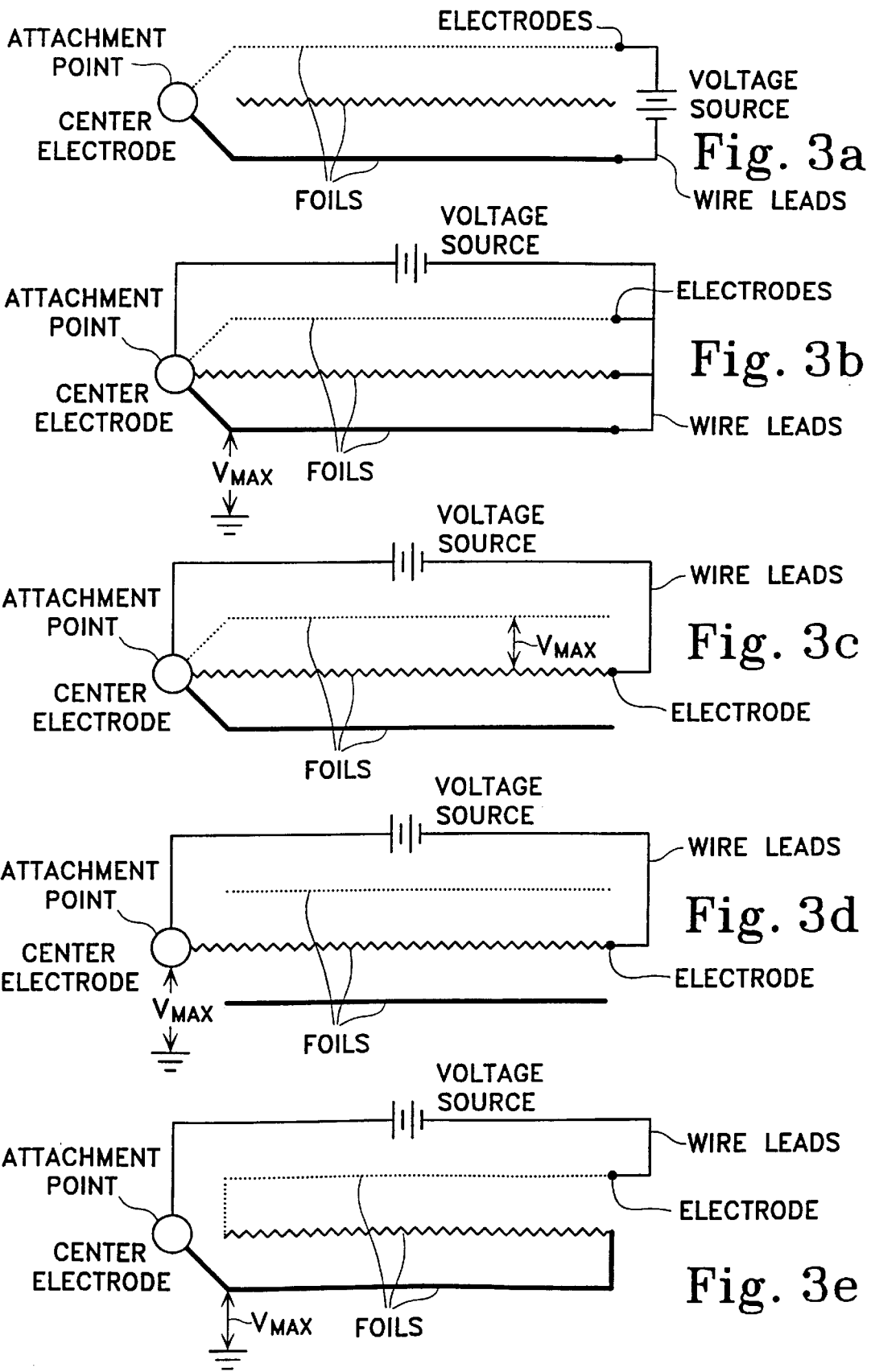
FIGS. 3a through 3e are schematic diagrams of three foil EHC units with a center electrode and at least one peripheral electrode.

FIG. 1a illustrates a preferred embodiment of the EHC unit 10 with two electrodes at the outer periphery. In general, the EHC unit 10 may be formed from any number of foils using peripheral electrodes and center electrodes. FIG. 3a illustrates an embodiment using three foils with two peripheral electrodes. FIGS. 3b through 3e illustrate a number of embodiments of three foil units with a center electrode and at least one peripheral electrode.

After the EHC unit 10 has been formed, corrugated foil 12 is attached to electrode 22 at its free end, and flat foil 14 is attached to electrode 24 at its free end. In general, electrodes 22 and 24 should be constructed from materials that can be attached to corrugated foil 12 and flat foil 14, provide low electrical resistance, and withstand the operating temperatures of the EHC unit 10.

Figure 5A:
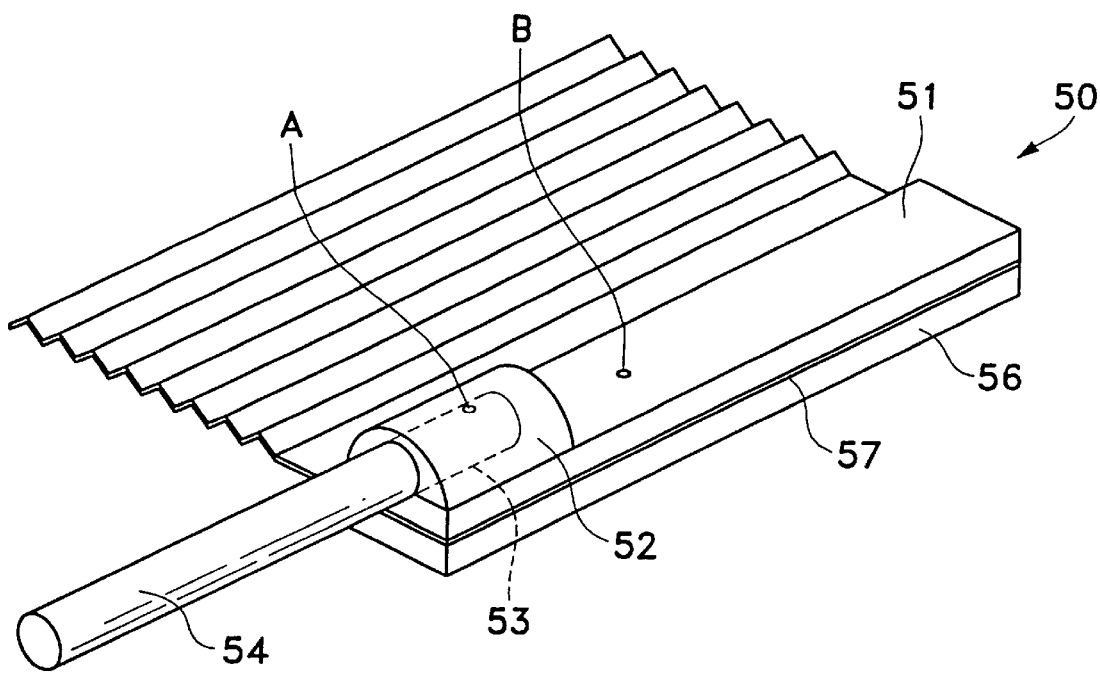
FIG. 5a is a drawing of a typical electrode and power lead attachment according to the invention.

One arrangement of a electrode 22 or 24 which could be used with the EHC unit 10 and which forms another embodiment of the invention is shown in FIG. 5a. In this design, the main electrode body, indicated generally at 50, consists of two flat metal weld strips 51 and 56 and a generally semicylindrical shaped connector part or socket 52 secured to one end of one of the weld strips 51 or 56. The connector part 52 further includes a center aperture or orifice for the insertion of an electrical lead 54. The electrical lead 54 is attached to the electrode 22 by any suitable low resistance method, such as by soldering with a high melting point braze, such as braze BAg-8. The corrugated foil 12 is attached to electrode 22 by sandwiching corrugated foil 22 between the weld strips 51 and 56, and then welding, crimping, soldering or otherwise providing a physical and electrical connection along edge 57. Generally, the material used for the weld strips 51 and 56 should be made from an oxidation resistant metal such as a Fe/Cr/Al alloy or Ni/Cr/Al alloys such as Alfa-IV produced by Allegheny Ludlum of Pennsylvania, Riverlite 20-5SR produced by Kawasaki Steel of Japan, or Haynes 214 produced by Haynes International of Indiana. Suitable materials for the leads 54 include, but are not limited to aluminum, silver, nickel, copper, stainless steel or and aluminum containing alloy. Similar materials and methods of attachment can be used for the center electrode when one is used.

In general for a current flow in the range up to 200 amps, the electrode connector 52 should have a wall thickness in the range of about 0.1 mm to about 3 mm. The flat electrode weld strips 51 and 56 should have a thickness in the range of about 0.5 mm to about 3 mm. In a preferred embodiment, the electrode connector 52 has a wall thickness of about 1 mm and the weld strips have a thickness of about 2 mm.

As an example, three sets of like electrodes 22 and 24 were made with the connector part 52 having a wall thickness of 0.6 mm, 0.9 mm, and 1.4 mm. In all three sets, the weld strips 51 and 56 had a thickness of 2 mm after welding to the foil. A silver lead 54 was inserted into the cylindrical hole 53 in the connector part 52, and brazed in place with BAg-8 alloy. These electrodes were then connected to a power supply to pass current through the silver lead and into the foil. Measured temperatures at locations A and B as shown on FIG. 5a are given in the following Table 1:

TABLE 1

| Electrode Dimensions Flow | | Location | Temperature Rise with Current | | |
| --- | --- | --- | --- | --- | --- |
| connector part(mm) | weld strip (mm) | Point A or B | 50 Amps C | 100 Amps C | 200 Amps C |
| 0.6 | 2 | A | 200 | >600 | Not tested |
| 0.6 | 2 | B | 50 | 360 | Not tested |
| 0.9 | 2 | A | 10 | 70 | 400 |
| 0.9 | 2 | B | 20 | 70 | 460 |
| 1.4 | 4 | A | 5 | 30 | 170 |
| 1.4 | 4 | B | 5 | 70 | 330 |

These data show that high electric current results in resistive heating of the connector and electrode components. For high temperature oxidation resistant alloys, relatively thick lead connector components and electrodes components are required to maintain a low operating temperature at air flow and air temperature conditions typical of those present in a gas turbine combustor. For electrical currents of 100 amps, the connector should be in the range of 0.9 mm thick and the total electrode thickness in the range of 2 mm while for currents as high at 200 amps, the connector should be in the range of 1.4 mm thick and the electrode 4 mm thick.

Figure 5B:
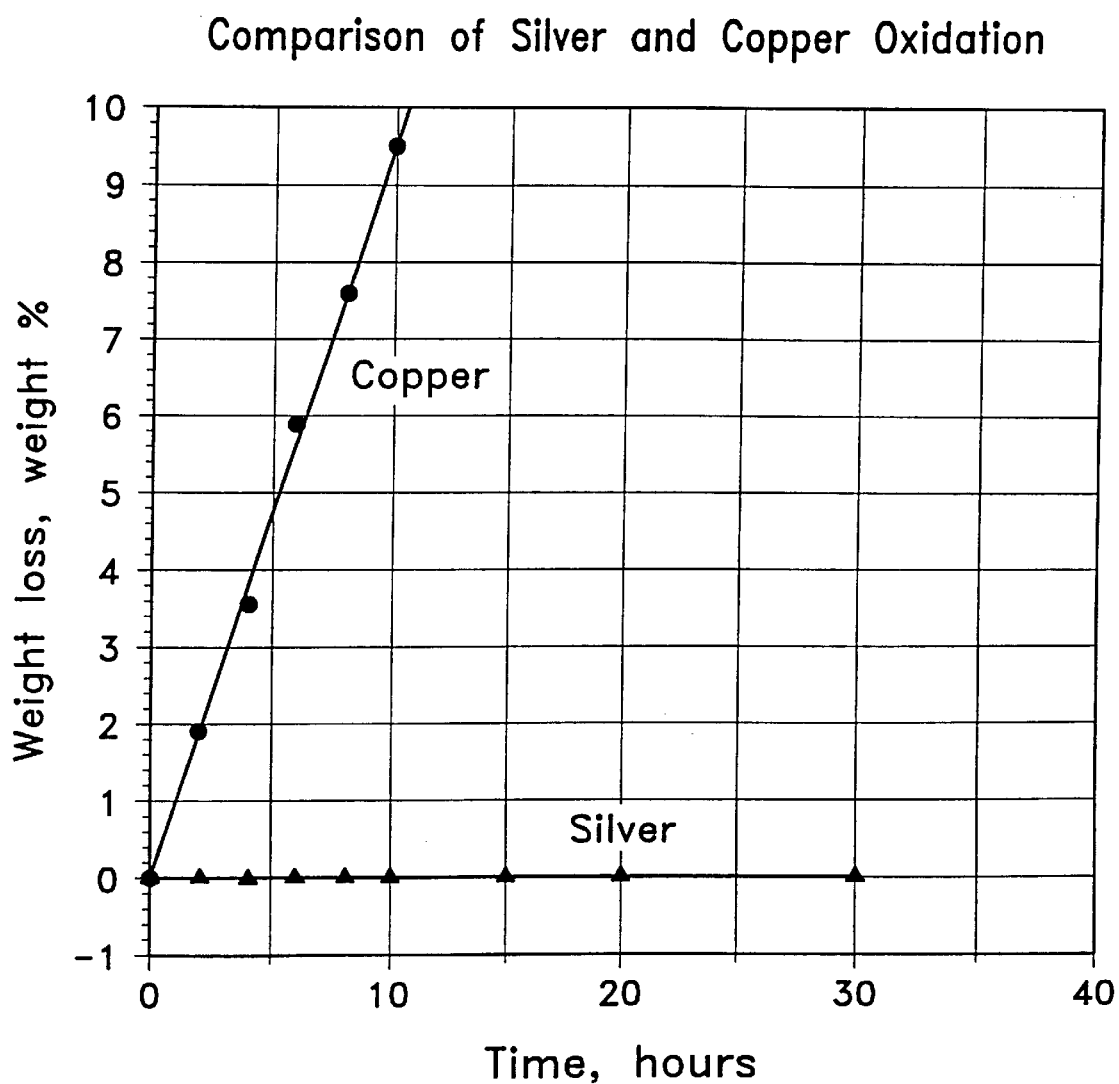
FIGS. 5b through 5d are graphic representations of test results showing the performance in terms of resistive heating and oxidation resistance of various electrical lead materials both according to and not according to the invention.

Similarly, the electrical leads bringing the electrical power to the EHC unit must also not be prone to resistive heating. The most common conductor material used for such leads would be copper due to its high conductivity. However, as shown in FIG. 5b, copper oxidizes very rapidly. For this test, a copper rod 1.5 mm in diameter and approximately 30 mm in length was placed in an air furnace and heated at 550° C. Periodically, the copper rod was removed from the furnace and weighed. The decrease in weight was due to formation and loss of a copper oxide. A similar test with a silver rod is also shown. These results are significant because a recuperated gas turbine would have a combustor inlet temperature of 500 to 600° C. and leads at the inlet of an EHC unit and copper leads would oxidize rapidly.

Figure 5C:
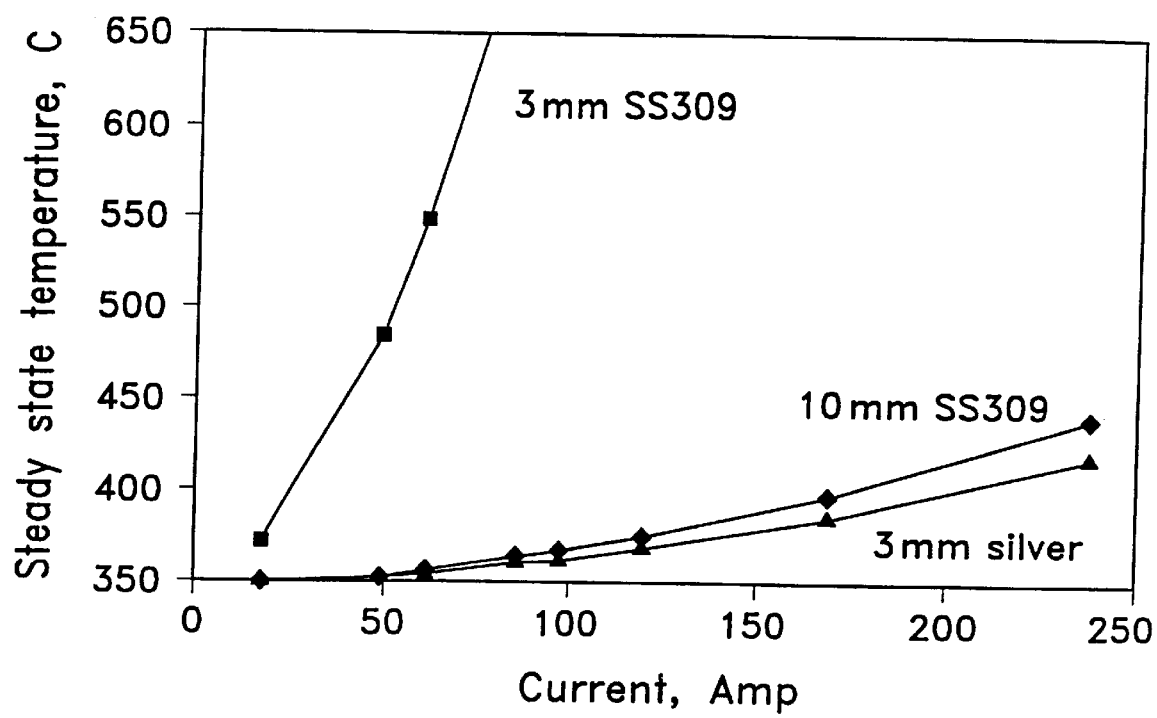

An alternative lead material is an oxidation resistant stainless steal such as Type 309 stainless steel or FeCrAl alloys or NiCrAl alloys. These alloys typically have a higher resistance and would be restively heated when used as leads for the EHC unit. Comparison data is shown in FIG. 5c where the calculated steady-state temperature is shown for each of the lead materials and diameters in a cross flow of air at 350° C. typical of the conditions or during start up. FIG. 5c shows that a 3 mm diameter 309 stainless steel lead would rapidly overheat even at currents of 50 amps. To minimize resistive heading of the 309 ss lead, the lead diameter would have to be 10 mm. Other iron or nickel based alloys would behave similarly.

Figure 5D:
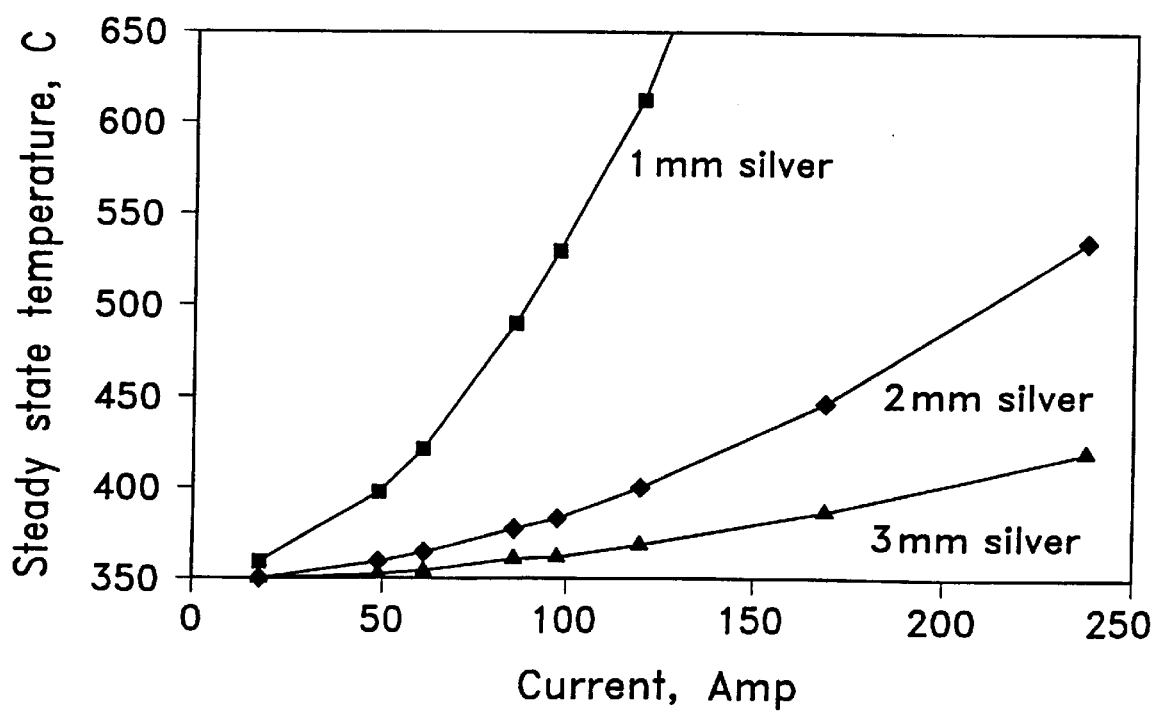

Silver is not generally considered a good lead material due to its expense and its low melting point. However, its properties make it uniquely useful as a lead material for EHC applications. As shown in FIG. 5b, it is very stable to oxidation at 550° C. and at substantially higher temperatures. FIG. 5d shows that the very high conductivity of silver results in very low resistive heating so that a 1 mm diameter lead could be used at 50 amps current, 2 mm diameter leads at 100 to 150 amps and 3 mm diameter leads for currents above 250 amps. Surprisingly, the 960° C. melting point of silver does not appear to be a problem in this application since no portion of the leads or connectors approach this temperature. In addition, very good low electrical resistance joints can be made between the silver lead and an iron based brazing alloys such as BAg-8 with 72% Ag-28% Cu and a melting point of 880° C. Other braze alloys can be used depending on the operating temperature of the lead and connector components at the braze joint.

While silver works quite well as a lead material, alloys of silver and other oxidation resistant elements can be used. Suitable alloying elements include platinum, palladium, rhodium, gold, copper and nickel. Also, the silver electrical current carrying lead can be a wire, a strip, or a specially designed connector to connect to the EHC unit and to penetrate the combustor wall and connect to the electrical power supply.

In one preferred embodiment of this invention, two foils are used to form the EHC unit 10. Two foils allows the free ends of the foils to be located at the outer periphery of the EHC unit 10 so as to facilitate attachment of the electrodes and power leads. It is desirable to have both electrodes at the periphery of the catalyst structure, so as to not interfere with the fuel/air mixture entering the EHC unit 10. While not as important for EHC units 10 used in automotive exhaust emissions control applications, it is important in a gas turbine application. An electrode or any irregularity in the gas flow can act as a flameholder that can stabilize a flame upstream of the catalyst, thereby overheating the catalyst and destroying it. However, more than two foils can be used and still have the electrodes 22 and 24 at the outer periphery of the EHC unit 10. FIG. 3a illustrates an arrangement using three foils that, when wound together to form a spiral, will have the electrodes at the outer periphery. In the embodiment shown in FIG. 3a, only two of the three foils are current carrying members.

Alternatively, the EHC unit 10 of the present invention can be constructed having a center electrode and one or more peripheral electrodes. FIGS. 3b through 3e schematically illustrates several alternate embodiments of the EHC unit 10 which use a center electrode. The center electrode is in the same location as the attachment point 20 of the foils. The configurations illustrated in FIGS. 3a through 3e use three different foils laid adjacent to each other. The foils will then be rolled about the center electrode to form the spiral structure. Similarly to the peripheral electrodes 22 and 24, the center electrode can be attached to the foils as shown in FIG. 5a. The three foil designs shown can be arranged in parallel or series electrical circuits using any number of the foils as current carrying members. For example, FIG. 3b illustrates a three foil EHC unit having each of the foils used as current carrying members in a parallel circuit, with three peripheral electrode connections and a center electrode. FIG. 3c illustrates a three foil EHC unit having one foil used as a current carrying member, with one peripheral electrode and a center electrode. The foils that are not used as current carrying members are electrically connected to the center electrode, thereby referencing the voltage seen between the foils to the center electrode. FIG. 3d illustrates a three foil EHC unit having one foil used as a current carrying member, with one peripheral electrode and a center electrode. The foils not used as current carrying members are not electrically connected to the circuit, thereby referencing the maximum voltage to the power supply voltage. Lastly, FIG. 3e illustrates a three foil EHC unit having all three foils connected in series to each other. The maximum voltage is seen across all three foils. This is the arrangement with the highest resistance, and the lowest current draw for a given voltage.

In general, the number of foils used as current carrying devices should be selected depending upon the available power supply and desired heat dissipation in the EHC unit 10. At least one side of the foils is normally coated with a insulative dielectric layer, and the configuration can be chosen to limit the maximum voltage seen between two layers. The following Table 2 gives values of current and maximum voltage (Vmax) for the different three foil configurations for a total power to the EHC unit of 10 kilowatts.

TABLE 2

| DESIGN | RESISTANCE(ohms) | VOLTS | AMPS | Vmax |
|--------|------------------|-------|------|------|
| 3a | 1.10 | 105 | 95 | 30 |
| 3b | 0.183 | 43 | 234 | ~12 |
| 3c | 0.550 | 74 | 135 | 74 |
| 3d | 0.550 | 74 | 135 | ~26 |
| 3e | 1.650 | 128 | 78 | 42 |

Figure 6:
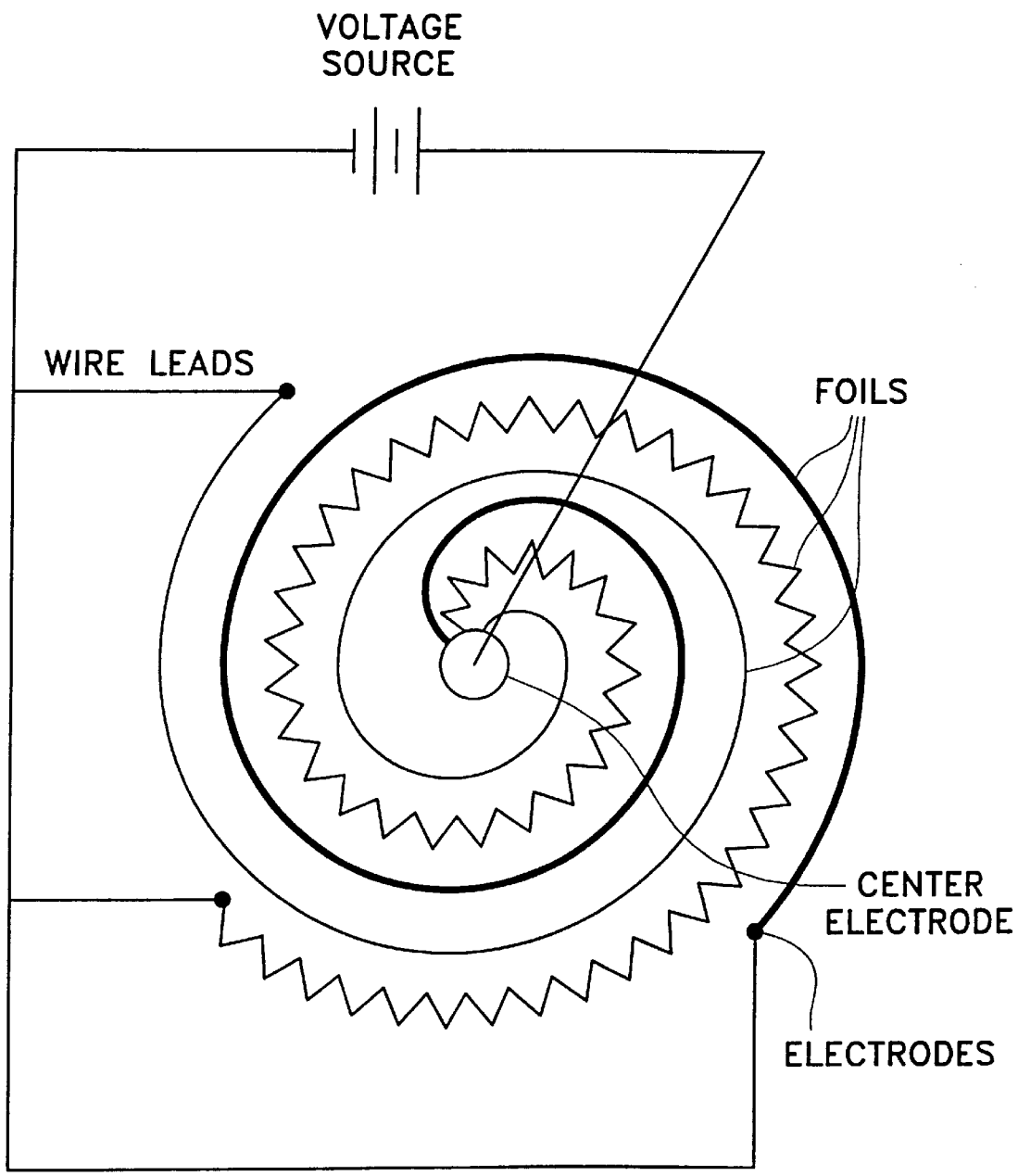
FIG. 6 is a schematic diagram of a three foil EHC unit with three peripheral electrodes and a center electrode.

Each of the foils used in the EHC designs of FIGS. 3a–3e can be the same or different. For example, the circuit of FIG. 3b can utilize three different foil corrugations and when wound into s spiral, would appear essentially as shown in FIG. 6. In this Figure, an electrode is attached to each foil and connected to the same connector of the power supply. As noted above, this parallel electrical circuit would have a low resistance and would draw a high current.

Figure 4:
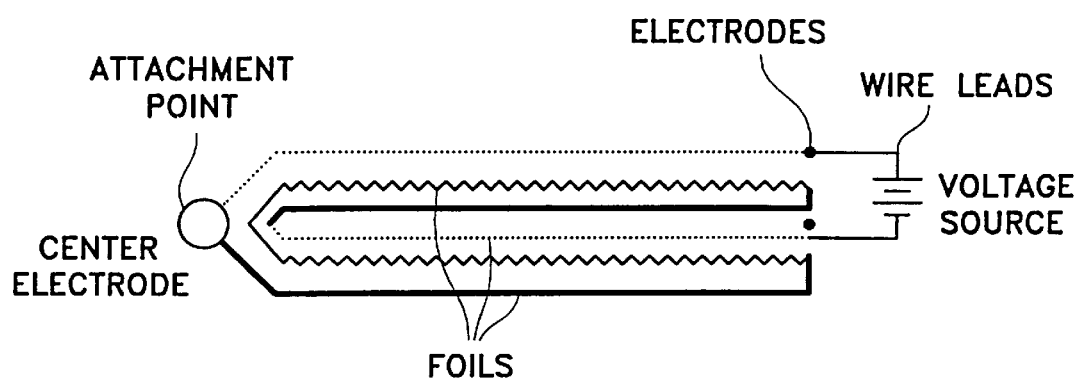
FIG. 4 is a schematic diagram of six foil series EHC unit with peripheral electrodes.

To obtain a high resistance and low current, the series circuit of FIG. 3e could be used. This design places an electrode at the center which may lie undesirable. A series circuit EHC with current flowing through all foils is shown in FIG. 4 where six foils are stacked together and connected as shown. When wound into a spiral, the EHC will have electrode at the periphery and will have a high resistance due to series circuit design. This design and any alternative design which employs a series circuit current flow coupled with electrodes located on the periphery of the catalyst structure comprises the most preferred embodiment of the invention.

When an electrical current is passed through the foils, the electrical resistance of the foils causes the EHC unit 10 to heat up. The heat is conducted to the catalyst layer and the catalyst is brought up to a temperature where it becomes reactive with the fuel/air mixture passing over the surfaces of the foils. The resistance of the EHC unit 10 has to be matched to the available power source. In automotive exhaust emission control applications, the EHC unit 10 should be designed to heat up very rapidly and be able to operate with an electrical input of 12 to 24 volts. The operator of an automotive vehicle should be able to enter the vehicle, insert the key and start the engine with little or no delay. Therefore, automotive EHC units should be designed to heat up very rapidly, and control emissions from the cold engine. Since the available voltage source is usually a battery with a low voltage, i.e., 12 to 24 volts, and a rapid heat up is desired, the EHC unit 10 should be made with a material of low resistance. As an example, for a 12 volt system and a power requirement of 2.5 kW, to quickly heat the catalyst, a total resistance of approximately 0.06 ohms and a current of 208 amps will be required. Alternatively, for hybrid vehicles having higher voltage sources such as 150 volts or higher, the resistance required for a 2.5 kW circuit would be 9 ohms and the current would be 17 amps. The EHC unit 10 for use in a gas turbine will not be limited to a battery voltage, and can therefore be constructed so as to have a high resistance with a consequent lower current for the same power dissipation.

The EHC unit 10 is heated by passing an electrical current through the foils. This necessitates the foils being insulated from one another, and the foils are generally coated with a dielectric (insulative) layer on at least one side to prevent the foils from shorting out against each other. The dielectric coating used on the surfaces of the foils in the EHC unit 10 must be chosen to withstand the voltages in use and the high operating temperatures of the catalytic reaction. Typically, the EHC unit 10 may operate in a voltage range of about 100 volts or higher. Using these higher voltages necessitates a dielectric coating with a high breakdown voltage for use between the foil layers. Suitable dielectric coatings are any ceramic material including, but not limited to, alumina, zirconia or other electrically insulating ceramic materials.

Catalyst Design Considerations

Figure 7:
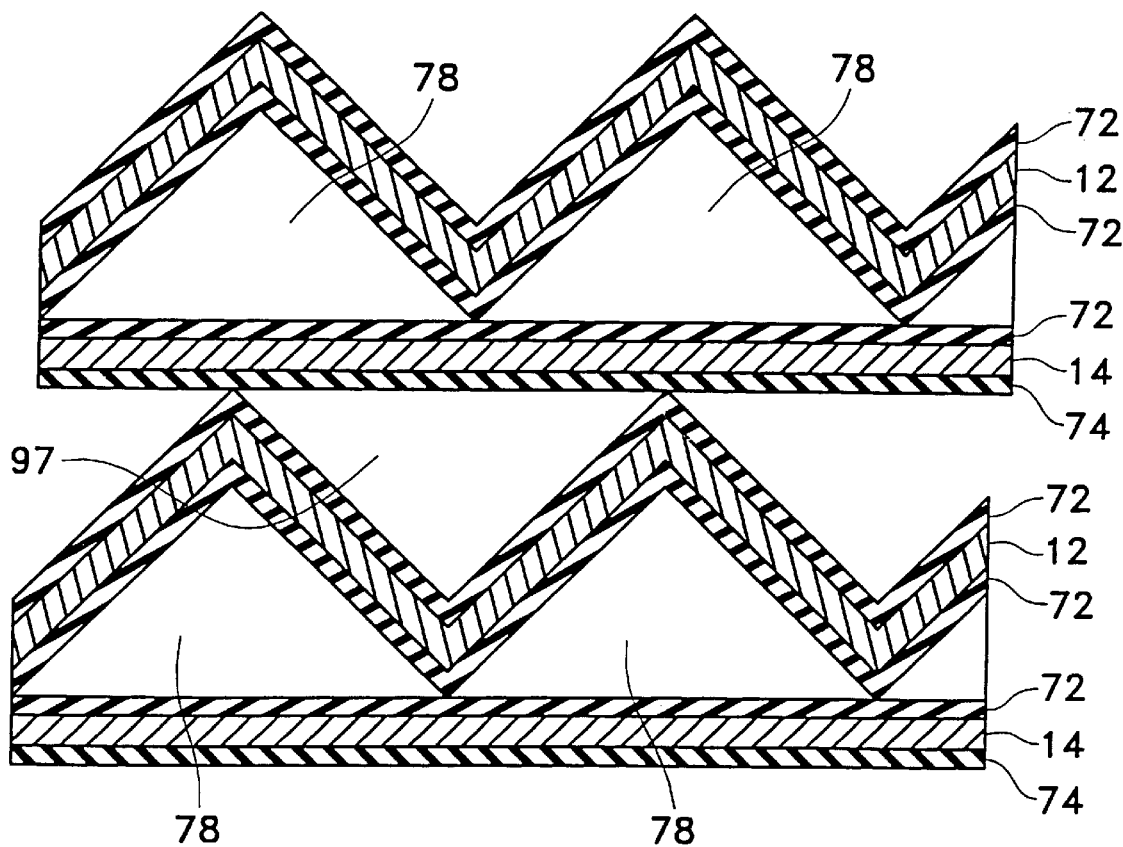
FIG. 7 is a close-up, cutaway view of an EHC unit showing the various layers of the structure.

Prior to assembling the corrugated 12 and flat or corrugated 14 catalyst support foils into the final spiral shape, the catalytic material and other coatings are applied in a series of several steps. A detailed portion of an EHC unit 10 showing the various coatings on both a flat foil 14 and a corrugated foil 12 is shown in FIG. 7. In general, these steps include first oxidizing both the corrugated 12 and flat 14 foils and coating the foils with a dielectric or washcoat (72 or 74). In addition, at least a portion of one side of either foil is coated with a catalyst which optionally, and preferably, may be incorporated into the washcoat (see above) such that the washcoat layer 74 includes the catalyst. In addition to the washcoat and catalyst layers, both foils may be coated with a dielectric coating (not shown).

As noted previously, the catalyst support foils are preferably aluminum-containing alloys. Both the flat 14 and corrugated 12 foils are first oxidized at temperatures in the range of 80 to 110° C. in air so that the aluminum forms alumina whiskers, crystals or a layer on the surface which provides a rough and chemically reactive surface for better adherence of the washcoat layer or dielectric coating layer. In general, the surfaces of foils that will have different applied electrical potential will be coated with a dielectric coating to electrically insulate these two foils from each other. The other side of these foils can be coated with a washcoat layer and catalyst, depending on the requirements of the catalyst design. In some case, it may be desirable to coat the second side with a dielectric coating or even to apply a dielectric coating layer underneath the washcoat and catalyst layer to provide improved electrical insulation between foils. For example, as shown in FIG. 7, the flat foil 14 is coated on one side with a dielectric coating 72 while the opposite side is coated with a washcoat and catalyst layer 74. In contrast, the corrugated foil 12 is coated on both sides with a dielectric coating 72.

In general, the choice of the type of washcoat used on the different types of support foils depends on the design of the EHC unit 10, (two foils, three foils, etc.), the choice of catalyst used, and where the catalyst is applied, as will be discussed in greater detail below. Therefore, these decisions are left to one skilled in the art to decide for each particular application of the invention.

In general, both the dielectric layer and the washcoat plus catalyst layer 72 or 74 may be applied by spraying, direct application, dipping the support foils into the washcoat, or by any other suitable manner. Typically, layers 72 or 74 will have a thickness in the range of about 3 to 50 micrometers. Materials suitable for the dielectric layer include, but are not limited to, silicon oxide, aluminum oxide, zirconium oxide, titanium oxide or mixtures of these oxides. These oxides may contain additions to stabilize the structure at high temperature such as yttrium, calcium and magnesium additions to zirconium oxide.

The washcoat plus catalyst layer 74 is coated on at least a portion of one side of one of the support foils. Materials suitable for use as the washcoat include, but are not limited to, aluminum oxide, aluminum oxide containing additives such as barium, lanthanum, silicon or other components to prevent or reduce thermal sintering and loss of surface area, zirconium oxide with or without additives such as silicon. The washcoat would preferably possess a moderate to high surface area, from 2 to 200 $m^2/g$.

The catalyst, active for the reaction of fuel with oxygen, is deposited within and on the surface of the porous washcoat layer. Suitable catalytic materials include, but are not limited to, Group VIII noble metals or the platinum group metals consisting of palladium, ruthenium, rhodium, platinum, osmium, and iridium. For methane or methane containing fuels, the preferred catalyst is palladium or platinum or a mixture of palladium and platinum. For other fuel such as gasoline, diesel fuel, alcohol fuels or a variety of other hydrocarbon fuels, palladium and platinum are the preferred catalysts. However, for the other fuels less active catalysts can be used including base metal oxide catalysts such as copper, cobalt, manganese, chromium, nickel or other active base metal oxide catalyst either as the pure oxide, in admixture with other elements or dispersed on a second oxide.

The catalyst may be incorporated onto the washcoat layer in a variety of different methods using metal complexes, compounds, or dispersions of the metal. The compounds or complexes may be water or hydrocarbon soluble. The liquid carrier generally needs only to be removable from the catalyst carrier by volatilization or decomposition while leaving the catalyst metal in a dispersed form in the washcoat layer. For the preferred mixed palladium/platinum catalyst, palladium ammonium nitrite can be mixed with platinum ammonium nitrite in water and an excess of nitric acid to form a solution which is sprayed onto a $SiO_2/ZrO_2$ washcoat-treated support foil followed by drying and calcination in air at high temperature.

An alternative preparation procedure for the washcoat plus catalyst layer is to prepare a mixture of the washcoat and catalyst components and apply this mixture to the foil surface in a single operation. Alternatively, the catalyst can be deposited onto the washcoat solid by impregnation or other suitable procedure and the heat treated to fix the catalyst on the washcoat surface.

Heat Transfer Design Considerations

Figure 8:
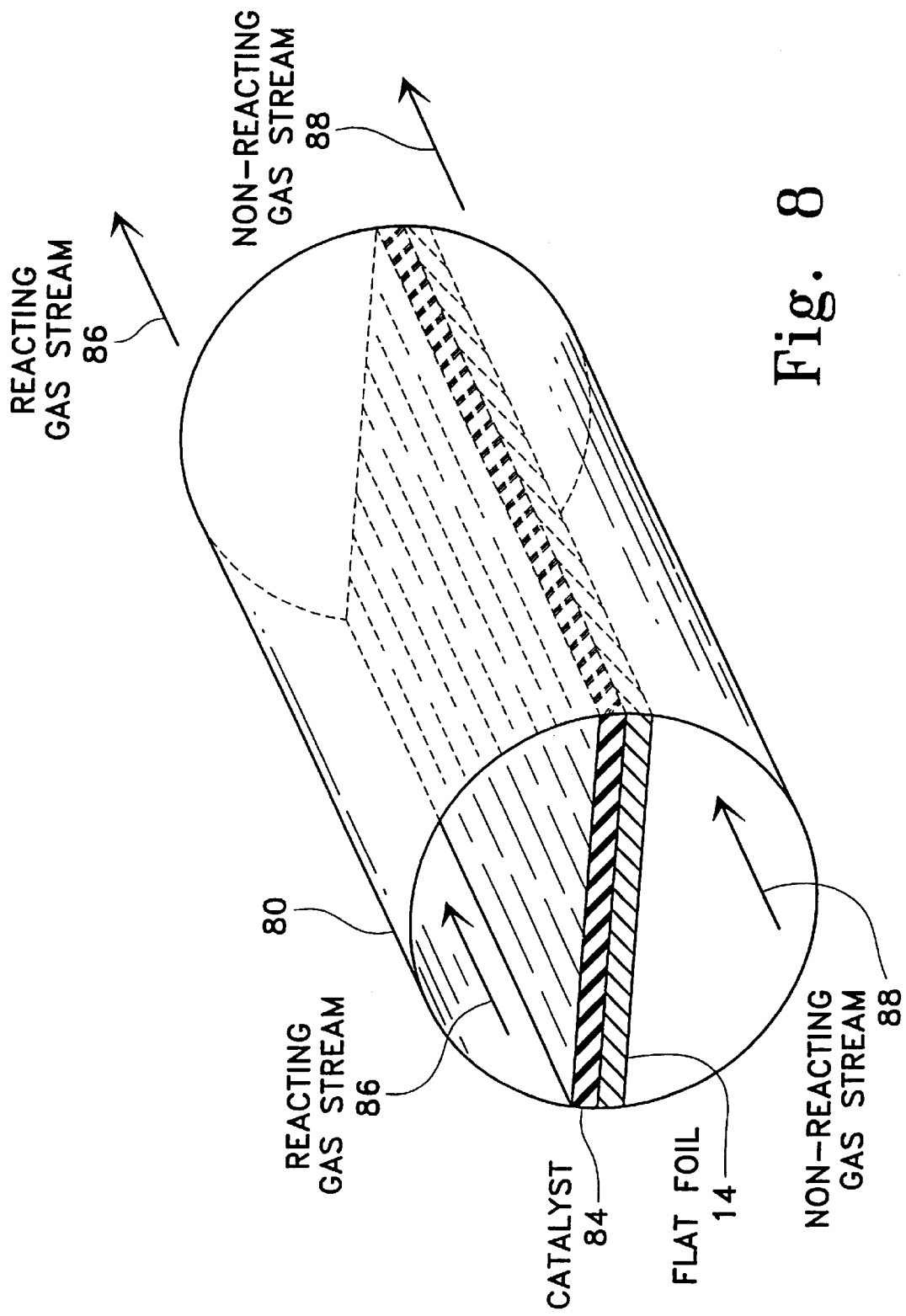
FIG. 8 is a perspective view of a simplified catalyst structure having one side of the catalyst support foil coated with catalyst and the opposite side not coated with any catalyst.

Coating the catalyst support foil with catalyst on only one side provides a catalytic surface with a very efficient heat exchange mechanism to the non-catalyzed opposite surface. As exemplified by the simplified catalyst structure, indicated generally at 80 in FIG. 8, if only one side of a flat support foil 14 is coated with the catalyst 84, then both a reacting gas flow 86 and a non-reacting gas flow 88 will result when the fuel/air mixture is passed over the catalyst structure 80. The heat generated from the catalytic reaction of the fuel and air on the catalyst surface is transferred to both the reacting gas flow 86 as well as through the flat support foil 14 to the non-reacting gas flow 88 on the opposite side of the support foil. Thus, in this simplified arrangement, the catalyst structure has "integral heat exchange" since the heat generated by the catalytic reaction is transferred by both conduction and convection to both the reacting gas flow 86 and the catalyst support flat foil 14 which functions as a heat sink. The heat in the support flat foil 14 is then removed by the non-reacting gas stream 88 located on opposite side of the catalyst coating 84.

This concept of integral heat exchange can be applied to the EHC unit 10 of the present invention. In these cases, if either the flat foil 14 or the corrugated foil 12 is coated with a catalyst on only one side and then rolled into a spiral structure, the resulting structure is one having a plurality of channels with only a portion of each channel being coated with the catalyst. The fuel/air mixture flowing over the surfaces of the portion of the channels having the catalyst coating results in the reaction of the fuel and air to generate heat. The heat is transferred to the fuel/air mixture flowing in that channel as well as being transferred through the channel walls (comprised of the washcoat plus catalyst layer and support foil) to the fuel/air mixture stream flowing in the adjacent channel. This can be seen by referring to FIG. 7, where channel 97 has a catalyst containing washcoat coating 74 in a portion of that channel. The heat generated in the catalyst layer 74 will be transferred to the fuel/air stream flowing in channel 97 as well as through the channel walls comprised of dielectric layer and corrugated foil 12 to the non-reacting fuel/air stream flowing through channels 78 (the fuel/air stream flowing in channels 78 are not undergoing catalytic reaction since no catalyst 74 is present in channels 78.)

An example of a catalytic structure utilizing integral heat exchange is illustrated in U.S. Pat. No. 5,250,489, issued to Dalla Betta et. al., the disclosure of which is hereby incorporated in its entirety. It is important to limit the temperature of the walls of the catalyst structure to avoid overheating and melting the substrate, and to prevent a runaway catalytic reaction. As combustion occurs at the catalyst surface, the temperature of the catalyst and the metal substrate will rise and the heat will be conducted and dissipated in the gas flow on both the catalytic side on the non-catalytic side of the channels in an IHE catalytic structure, as described above. This will help to limit the temperature of the catalyst substrate and will aid in maintaining the catalyst-coated wall temperature in the range of about 700° C. to 1000° C. In general, the heat transfer design of the EHC unit 10, including an IHE design must limit the temperature of the catalyst substrate to a maximum temperature above which catalyst and support foil damage will occur. While this maximum temperature depends on the type of material used for the support foil and the type of catalyst used, this maximum temperature is typically about 1100° C.

A number of heat transfer configurations can be designed for a catalyst structure. For example, a catalyst structure can be designed such that some of the channels are completely coated with the catalyst with the adjacent channels having no catalyst coating. Alternatively, a catalyst structure can be designed such that only some of the channels have a portion of their walls coated with the catalyst layer. Finally, all of the channels can be partially coated with the catalyst. This latter type of configuration where all channels are at least partially coated with the catalyst is a preferred embodiment because most or all of the fuel should be catalytically combusted and yet the heat generated by the catalytic reaction can be effectively removed.

Having now described the structure of the EHC unit 10 in accordance with the present invention, a method for starting up a gas turbine using the inventive EHC unit 10 will be explained below.

Start-up Method for a Gas Turbine

In general, the method for starting up a gas turbine includes the steps of applying electrical power to the catalyst structure to heat the catalyst to a predetermined temperature limit and then introducing a fuel/oxygen-containing gas (such as air) mixture into the catalyst structure. The electrical power to the catalyst structure may be terminated when one of several conditions are met including, but not limited to, when the heat of the catalytic reaction is sufficient to maintain the catalyst at steady-state condition or when a certain period of time has elapsed.

The general method described above can be best described using FIG. 9a and 9b. The gas turbine system consists of a compressor 32 which compresses air 31 to produce a high pressure flow that proceeds through diverter valve 41, electric preheater 43, combustor 34 and then on to power turbine 36 which produces the mechanical power to drive the load 49, typically an electrical generator. The combusted fuel and air exits the gas turbine through the exhaust 98. The energy to drive the gas turbine is generated in combustor 34 where fuel is injected through injector 45 and mixed with air to form a fuel/air mixture which flows over catalyst 10 and is combusted in the catalyst and in the downstream post catalyst combustion zone 35.

Figure 9A:
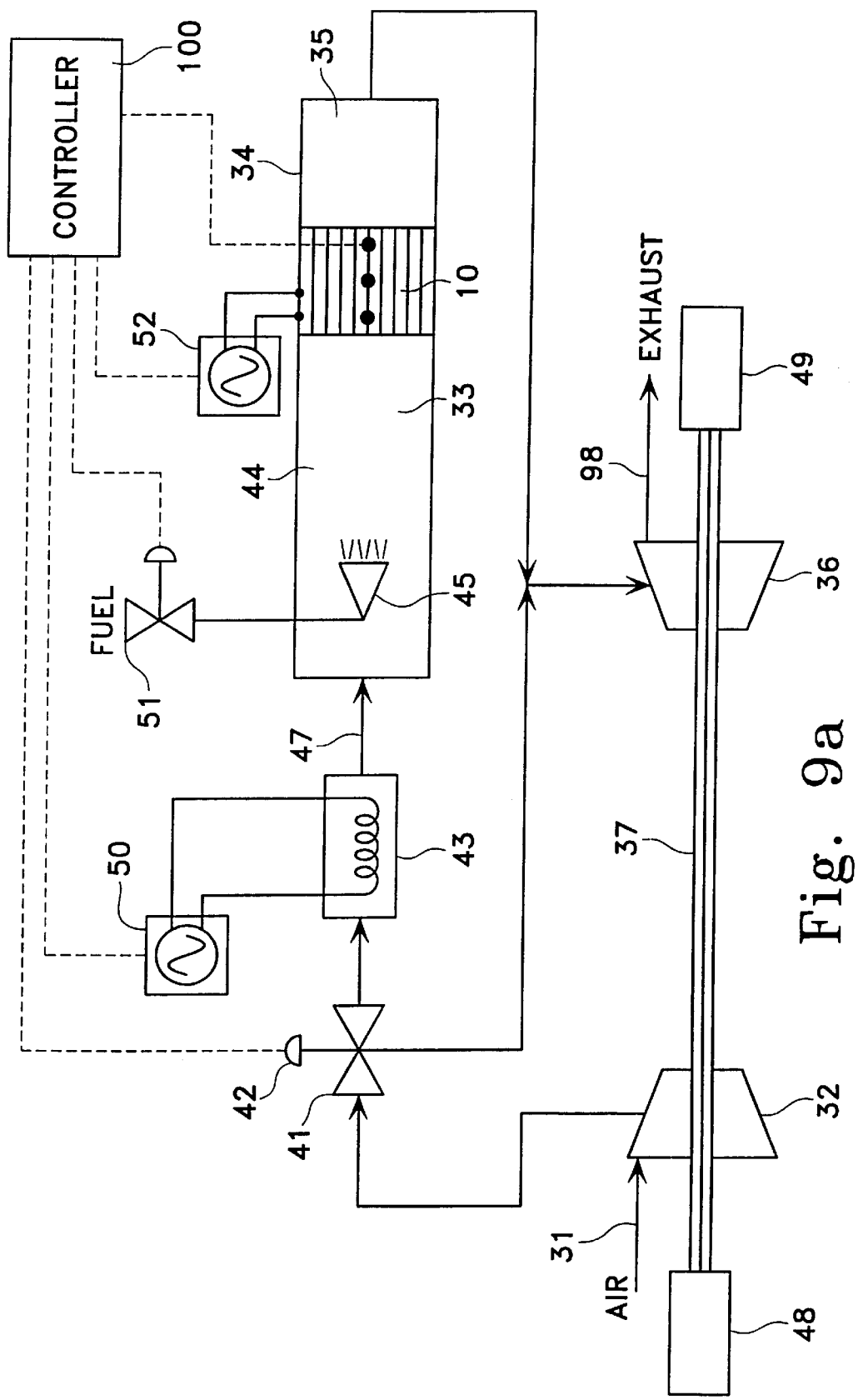
FIGS. 9a and 9b are a detailed portions of the block diagram presented in FIG. 2 with this detailed diagram showing instrumentation useful for operating a gas turbine.

Fuel injector 45 injects the fuel into the flowing air stream and should produce a relatively uniform fuel/air mixture at the catalyst inlet 33. For gaseous fuel such a methane or natural gas, the fuel injector will inject the fuel and cause it to be mixed with the air and can be any of the designs familiar to those skilled in the art. For a liquid fuel such as gasoline, diesel fuel or alcohol fuels, the fuel injector would preferably inject the fuel as a spray of small droplets and cause the fuel to vaporize to form a uniform gaseous mixture at the catalyst inlet. Alternatively, fuel injector 45 could consist of a prevaporizer that forms a fuel vapor that is then injected into the air stream as a gas. The fuel injector can take the form of an inline device, placed essentially in the air flow as shown schematically in FIG. 9b, it can incorporate air mixing devices such as swirlers, partial blocking mixing devices, reversal of the air flow or other designs familiar to those skilled in the art. The general method of control can utilize a variety of sensors that will be described. Thermocouples or resistance temperature measurement devices 90 can be located in the catalyst unit 10. These thermocouples can be attached to the metal foil surfaces in the catalyst either the catalyst-coated foil or the non-catalyst-coated foil. Alternatively, a temperature sensor can be located just downstream of the catalyst 92 to measure the gas temperature exiting the catalyst. These temperature sensors would be connected to the controller 100. The controller would also be electrically connected to power controller 50 as shown in FIG. 9a which controls power to the preheated that heat the air going into the combustor 34. In addition, the controller is connected to power controller 52 which is connected to the EHC catalyst and controls the electrical power sent to the EHC catalyst. The controller 100 also controls the diverter valve 41 and the fuel control valve 51. The electronic controller 100 may be used to automatically control the start-up method by processing the signals described above and other signals relating to the operating conditions of the gas turbine system and then providing output signals to several of the components used in the system. For example, the electronic controller 100 could be used to terminate the electrical power supplied to the catalyst structure whenever a certain condition is sensed. Alternatively, the electronic controller 100 could be used to operate the bypass valve 41 or the fuel supply nozzle 45.

While it is envisioned that this start-up method may be automatically controlled based on sensed operating parameters, the type of electronic controller 100 or other device used to achieve the automatic control is not critical to the inventive method. However, in general, the controller 100 may be embodied as a conventional microprocessor or similar computing apparatus which can be programmed to generate one or more electrical output signals in response to a plurality of electrical input signals. The controller 100 may include a central processing unit (CPU) having analog and/or digital electronic calculation and logic circuitry for effecting arithmetic operations and processing data under the control of one or more algorithms. Also the CPU would receive input signals from a number of sensors which measure the various operating parameters of the EHC unit 10 and the system it is used in, such as a gas turbine system. The controller 100 may also include one or more memory modules, such as read-only memory (ROM) for storing predetermined data, random-access or data memory (RAM) for storing calculated or input data, and control memory for storing the control algorithms.

The first step in the inventive start-up method of the gas turbine is to use a starter 48 to rotate the compressor/turbine system causing air to be driven through the compressor 32, combustor 34 and turbine 36. At the desired rotational speed, power is applied to the electrical heater 43 by activating power controller 50. Also, at some predetermined conditions, power controller 52 is activated to apply electrical power to the EHC catalyst unit 10. At some predetermined point, selected either by time or by reaching some set temperature in temperature sensors 90 or 92, fuel flow is initiated by activating fuel control valve 51 to introduce fuel into the preheated air flow and to initiate combustion in the catalyst 10 and combustor 34 supplying power to turbine 36.

In a preferred embodiment of the invention, the catalyst substrate is electrically heated until the catalyst temperature is within about 100° C. of the normal steady-state operating temperature of the catalyst before the fuel/air mixture is introduced. As may be expected, the steady-state operating temperature will be different for each type of catalyst. However, as an example, for the preferred mixed palladium/platinum catalyst, the steady-state operating temperature of this catalyst is between about 700° C. to about 900° C. More preferably, the fuel/air mixture is not introduced until the catalyst substrate temperature is within about 50° C. of the normal steady-state operating temperature of the catalyst.

The amount of electrical power supplied to the catalyst structure can be constant, modulated, or a combination of both. Alternatively, the power may be modulated in response to variances in the measured catalyst substrate temperature. For example, the electrical power to the EHC and the fuel flow can be controlled on a preset time sequence with the EHC power turned on for a preset period of time and then the fuel flow turned on and the EHC power turned off at a preselected time. Alternatively, the EHC power can be controlled based on measure temperatures such as from temperature sensor 90 or 92. The EHC power can be turned on at a high level until the catalyst substrate is near its steady-state operating temperature, then the EHC power modulated to hold the catalyst at its steady-state temperature and the fuel turned on. As the fuel reacts on the catalyst, the catalyst temperature would rise rapidly and the controller would turn off the EHC power. A variety of different control schemes can be devised by those skilled in the art and these schemes can be incorporated into the control algorithms of controller 100.

The effectiveness of these control schemes would be determined by measuring the total emissions from the gas turbine system by monitoring the CO, UHC (unburned hydrocarbons) and NOx levels in the exhaust 98 of FIG. 9a.

Once the desired catalyst substrate temperature is achieved, the fuel/air mixture is introduced into the catalytic combustion chamber 34. The amount, rate, temperature, and pressure at which both the fuel and air is introduced into the combustion chamber 34 is dependent on a number of factors, particularly on the design and operating characteristics of the gas turbine engine. The size of the EHC catalyst is determined by the size, air flow characteristics and fuel air ratio of the gas turbine. Independent of the size of the gas turbine and EHC catalyst, the normal steady-state, operating temperature of the catalyst is typically in the range of about 700° C. to about 1000° C. In addition, the theoretical adiabatic combustion temperature for the fuel/air mixture may be in the range of about 1100° C. to about 1600° C.

The electrical power to the EHC unit 10 is terminated when one of several conditions occurs. In one embodiment, this condition may be when the heat of the catalytic reaction between the fuel and air is sufficient to maintain the catalyst at its steady-state operating temperature. This condition occurs when the measured catalyst substrate temperature begins to rise due to reaction of the fuel. The controller 100 would sense this rise in temperature and decrease or shut off EHC power.

In another embodiment, additional thermocouples may be used to measure the substrate temperature of the catalyst layer, including thermocouples located at the inlet, middle and outlet portions of the EHC unit 10. In this embodiment, these three catalyst substrate temperatures are monitored, and the power is turned off when one or any combination of them reach a predetermined limit. In any event, the substrate temperature should not be allowed to exceed the maximum catalyst substrate temperature, approximately 1050° C. In yet another embodiment, the thermocouple measuring the combusted fuel/air mixture at the outlet of the catalyst structure 10 or the thermocouple used downstream 93 can be used to terminate the power. For example, power may be shut off if either of these gas outlet temperatures exceeds the steady-state outlet gas temperature. In the preferred embodiment described herein, this temperature would be 750 to 800° C.

EXAMPLES

The following examples describe both the structure of the inventive EHC unit 10 and their performance under start-up conditions.

Example 1

This example describes the preparation of an EHC unit 10 and its use under start-up conditions without electrically preheating the catalyst surface prior to the introduction of the fuel/air mixture.
EHC Unit Preparation:

A first, $SiO_2$-$ZrO_2$ washcoat was prepared by first mixing 20.8 g of tetraethylorthosilicate with 4.57 cc of 2 mM nitric acid and 12.7 g of ethanol. The mixture was added to 100 g of zirconia powder having a specific surface area of 100 $m^2$/gm. The resulting solid was aged in a sealed glass container for approximately 24 hours and then dried. A major portion of this dried solid was calcined in air at 1000° C. while the remaining portion was calcined in air at 500° C. A sol was prepared by mixing 152 g of the $SiO_2$/$ZrO_2$ powder calcined at 1000° C. and 15.2 g of the $SiO_2$/$ZrO_2$ powder calcined at 500° C. with 3.93 g of 98% H2SO4 and 310 cc of distilled water. Finally, the mixture was milled using $ZrO_2$ grinding media for eight hours to produce the $SiO_2$/$ZrO_2$ sol.

The $SiO_2$ sol consisted of a commercially available colloidal silicon oxide sol produced by PQ Corporation, Ashland, Mass. and designated Nyacol Colloidal Sol 2034.

A flat foil catalyst support was made from a Fe/Cr/Al alloy with a composition of 20% Cr, 5% Al and the balance Fe. A metal foil strip of 50 micrometers thickness and 75 mm width was first treated at 900° C. in air to form a surface oxide coating. One side of the flat foil was sprayed with the colloidal sol $SiO_2$ to a thickness of about 5 micrometers. The coated flat foil was then calcined in air at 1050° C. Next, the opposite side of the flat foil was sprayed with the $SiO_2$/$ZrO_2$ washcoat to a thickness of about 40 micrometers. The coated foil was again calcined in air at 1050° C. A mixed palladium/platinum catalyst was next applied to the side of the flat foil coated with the $SiO_2$/$ZrO_2$ washcoat by first preparing a palladium/platinum solution. The palladium/platinum solution was made by dissolving Pd(NH3)2(NO2)2 and Pt(NH3)2(NO2)2 in water and an excess of nitric acid to form a solution of about 0.1 g Pd/ml and a Pd/Pt ratio of about 6. The palladium/platinum solution was sprayed onto the $SiO_2$/$ZrO_2$ coated side of the flat foil to a loading of about 0.25 g Pd/g of $SiO_2$/$ZrO_2$.

A corrugated support foil was also made from the same 50 micrometer thick Fe Cr Al alloy foil. A strip measuring 76 mm in width and having straight corrugations with a height of about 1.2 mm was first treated at 900° C. in air to form a surface oxide coating. Both sides of the corrugated foil were sprayed with the colloidal $SiO_2$ sol to a thickness of about 5 micrometers. The coated corrugated foil was then calcined in air at 1050° C.

The catalyst structure was then assembled by first sandblasting the ends of both foils to remove the oxide coating. One end of both the corrugated foil and the flat foil were inserted into a longitudinally-extending slot in the center of a cylindrical rod. The assembly was then welded along the length of the rod. The two foils were then wound around the center rod to form a cylindrical catalyst structure. The remaining ends of the foils were also cleaned by sandblasting and welded to a flat electrode structure similar to that shown in FIG. 5*a*. A silver lead was attached to the outer electrode and the center cylindrical rod (which was also functioning as an electrode.) The resulting spiral wound catalyst structure measured 50 mm in diameter and 75 mm in length and had a center electrode and a peripheral electrode. In addition, the resulting catalyst structure had a catalyst-coated wall in half of the channels.

Figure 9B:
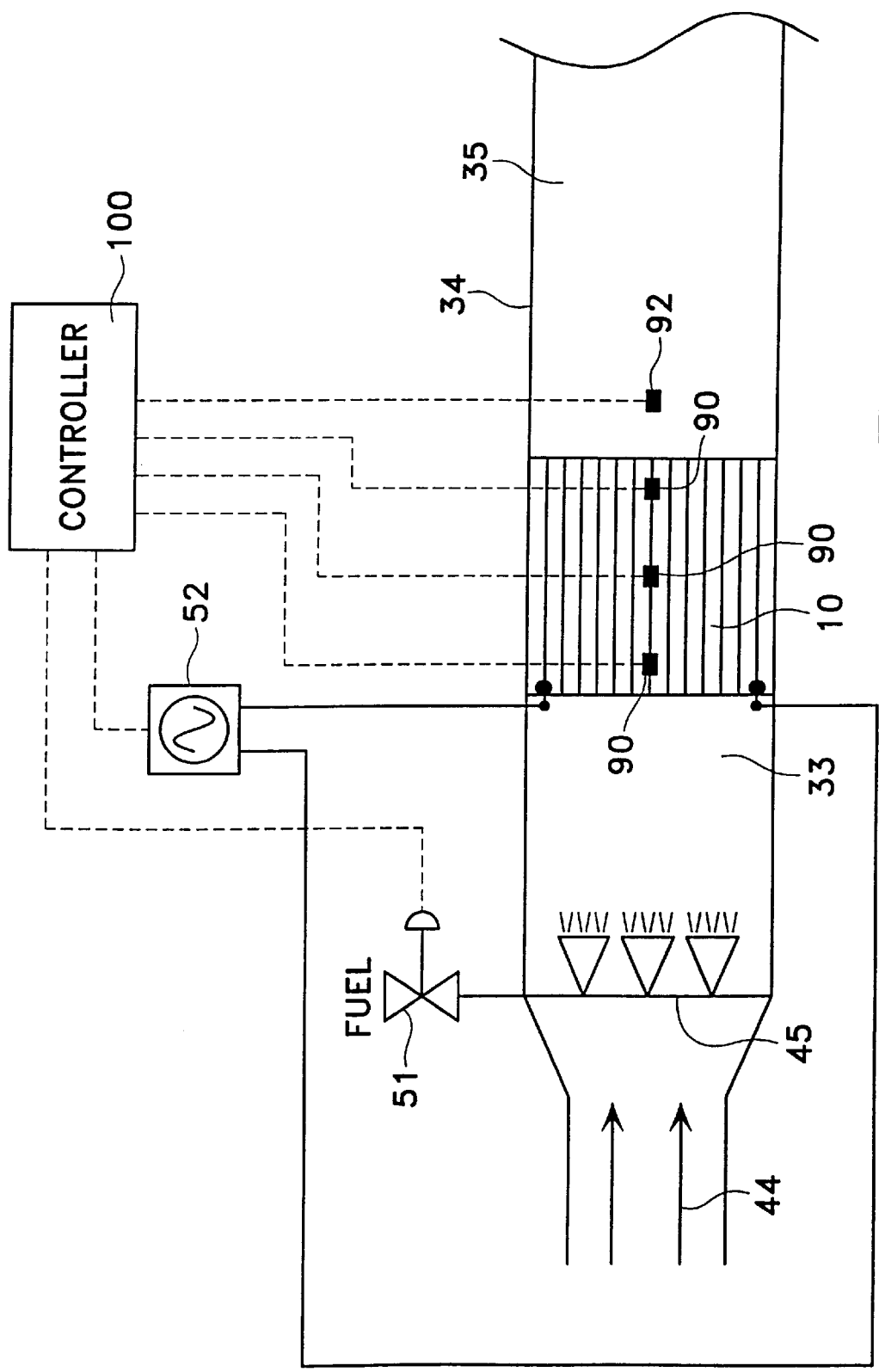

The EHC unit 10 was installed in a combustion reactor test system having provisions for passing air at a controlled flow rate through the catalyst structure and for preheating the air before it entered the combustion reactor. In addition, the combustion reactor system included provisions for injecting liquid fuel into the flowing air stream and for uniformly mixing the fuel and air before it enters the combustion reactor. Electrical leads were inserted through the walls of the combustion reactor and connected to the center electrode and the peripheral electrode. Outside of the reactor, the electrical leads were connected to a DC power supply. Additional equipment was installed to measure the performance of the EHC unit including a thermocouple for measuring the substrate temperature of the catalyst-coated flat foil, a thermocouple for measuring the temperature of the partially combusted gas mixture immediately after it leaves the catalyst structure, and a third thermocouple for measuring the temperature of the combusted gas mixture at the outlet of the reactor, which was approximately 80 cm downstream of the catalyst unit. In addition, a water cooled gas sampling probe was installed in the reactor, approximately 82 cm downstream of the catalyst structure, to measure the composition of the gas at the outlet of the combustor test rig.
Start-up Test Apparatus:

To evaluate the performance of the EHC unit and the start-up procedure, a test rig was used to simulate the combustion system shown in FIGS. 9*a* and 9*b*. This test system consisted of the following items:

- An air compressor and a flow control system to provide the desired air flow;
- An electric heater similar to electric heater 43 to preheat the air stream entering the combustor 34;
- A combustion reactor essentially similar to that shown in FIG. 9*b* containing a fuel injector, the catalyst and a post-catalyst reaction zone.
- Electrical leads penetrated the combustor wall to electrically connect to the electrodes of the EHC and to connect to a DC power supply that could control the electrical power to the EHC unit;
- Thermocouples installed within the EHC to measure substrate temperature, a thermocouple just downstream of the catalyst to measure the temperature of the gas exiting the EHC unit, and a thermocouple at the end of the combustion section 35; and
- A gas sampling probe was located at the end of combustion section 35 to measure the composition of the combustor exhaust, particularly CO and UHC (unburned hydrocarbons).

Start-up Test Conditions:

The following steps were used to test the EHC unit described above under start-up conditions:

1. The air flow through the combustion reactor was set to 240 standard liters per minute (SLPM). This value is consistent with the air flow present in a gas turbine at ignition speed when adjusted for the required size of catalyst necessary for typical catalystic combustion performance.

2. The air was preheated to 450° C.

3. Electrical power was NOT applied to the catalyst.

4. Isooctane fuel was supplied at a flow rate of 7.9 g/min. The fuel injection was started at the time 75 seconds at shown in FIG. 10a.

5. The temperatures of the catalyst substrate and combusted gas mixture and the emissions were monitored throughout this test.

Figure 10A:
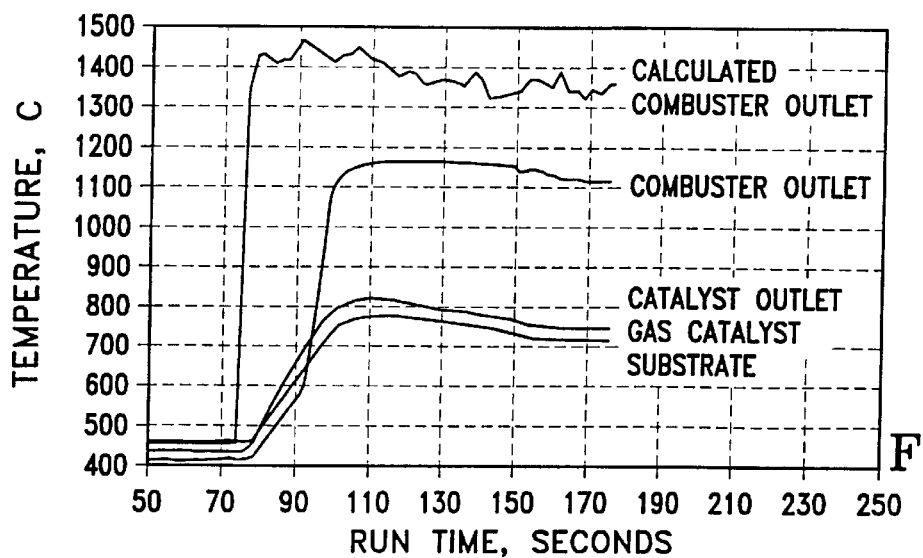
FIGS. 10a through 10c are temperature and emission results from a test in which an EHC unit in accordance with the present invention was used in a combustion reactor without electrically preheating the catalyst structure prior to the introduction of the fuel/air mixture.
Figure 10B:
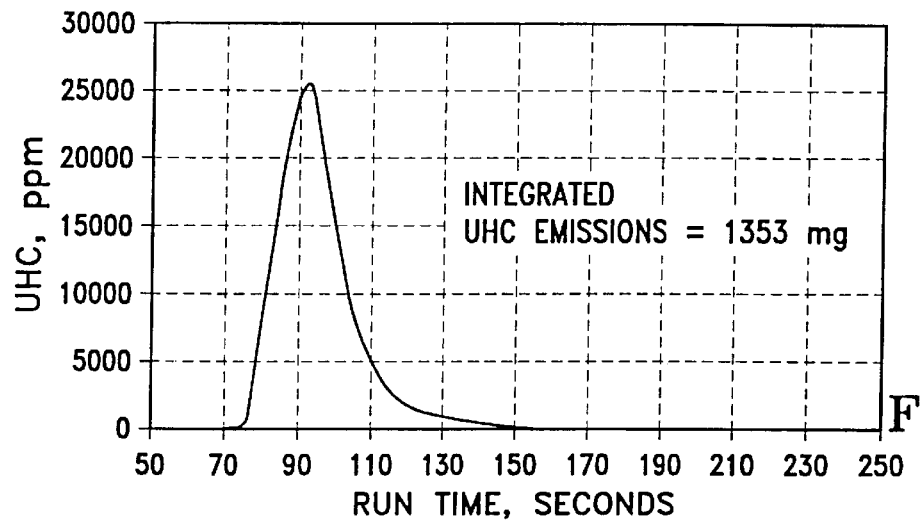
Figure 10C:
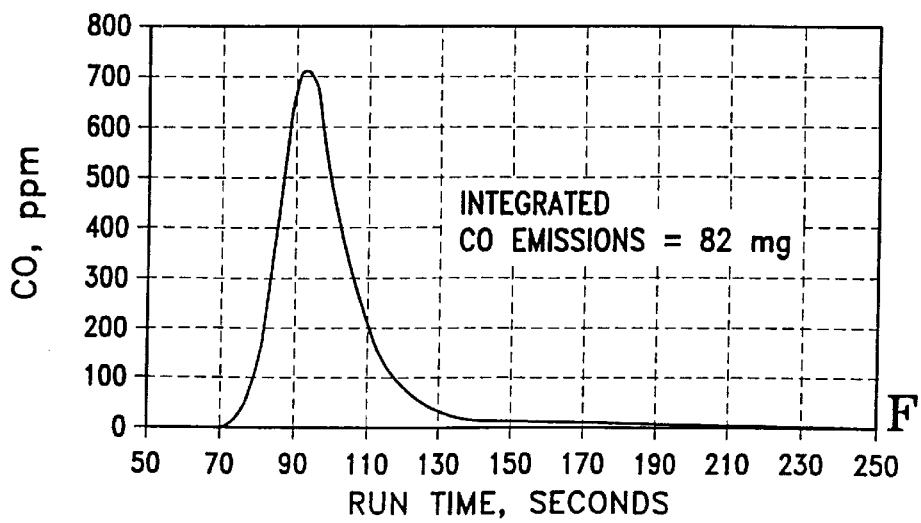

The results of this test are shown in FIGS. 10a through 10C. FIG. 10a shows the temperature profile in the catalyst substrate as the isooctane reacts on the catalyst and increases the catalyst temperature. In addition, FIG. 10a shows that the temperature of the combusted gas mixture at both the outlet of the EHC unit 10 and the outlet of the reactor also increase due to the catalytic reaction occurring within the reactor. The calculated combustion reactor outlet temperature is that temperature that would occur if complete combustion of the fuel takes place in the reactor. The combustor outlet temperature is below the calculated combustor outlet temperature due to heat loss through the walls of the combustor test rig.

FIGS. 10b and 10c show the total amount of uncombusted hydrocarbons (UHC) and carbon monoxide (CO) emissions which resulted under these test conditions. Unburned fuel will escape through the catalyst structure and exit the combustion reactor at very high levels until the temperature rises sufficiently high to fully combust the fuel and CO. Integration of a concentration versus time curve for each type of emission provides the total amount for that emission. FIG. 10b and 10c shows that the integrated emissions for the UHCs were 1353 mg while the integrated emissions for the CO was 82 mg. These start-up levels are very high and would result in an unacceptably high total emissions.

Example 2

This example shows the use of an EHC unit 10 with electrical preheating of the catalyst surface prior to the introduction of the fuel/air mixture.

EHC Unit Preparation:

The catalyst and test system used in this test are the same as in Example 1. In this case, electrical power is applied to the catalyst prior to introducing the fuel.

Start-up, Test Conditions:

1. The air flow through the combustion reactor was set to 240 standard liters per minute (SLPM). This value is consistent with the air flow present in a gas turbine at ignition speed.

2. The air was preheated to 450° C.

3. Electrical power is applied to the catalyst unit to achieve a catalyst substrate temperature of 750° C.

4. The flow of isooctane fuel was started at a flow rate of 7.9 g/min. The fuel injection was started at approximately 18 seconds as shown on FIG. 11a. When the catalyst temperature reaches 800° C. from reaction with the fuel, the electrical power was shut off.

5. The temperatures of the catalyst substrate and combusted gas mixture and the emissions were monitored throughout this test.

Figure 11A:
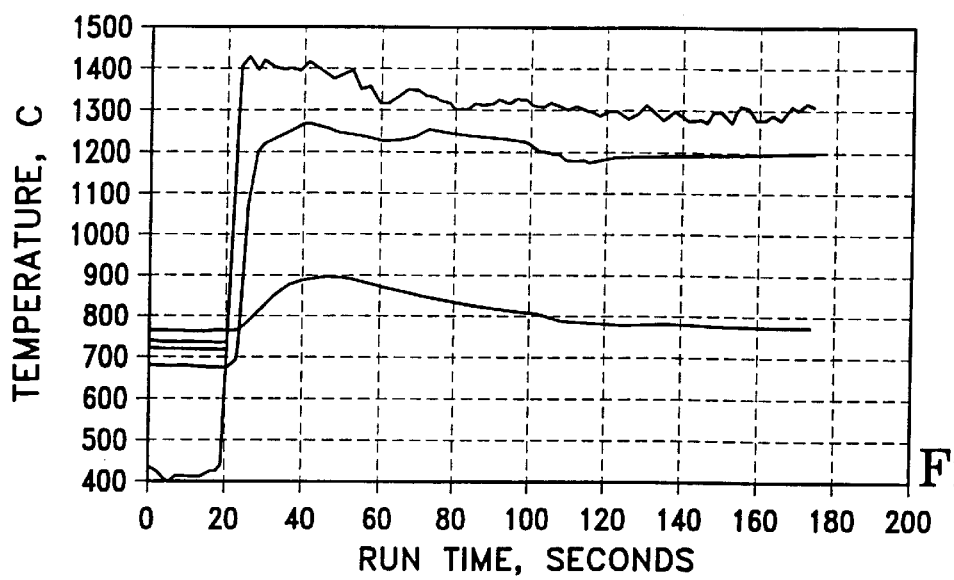
FIGS. 11a through 11c are temperature and emission results from a test in which an EHC unit in accordance with the present invention was used in a combustion reactor with electrically preheating the catalyst structure prior to the introduction of the fuel/air mixture.
Figure 11B:
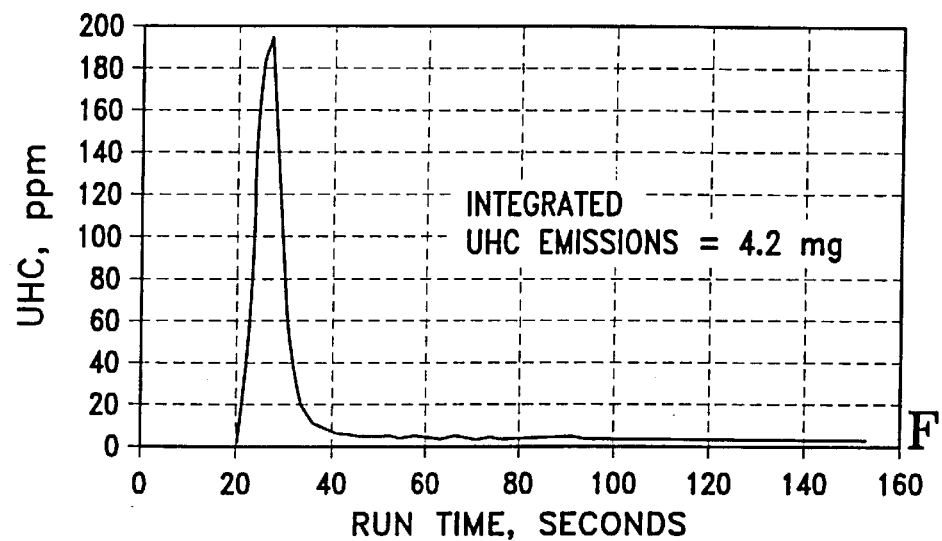
Figure 11C:
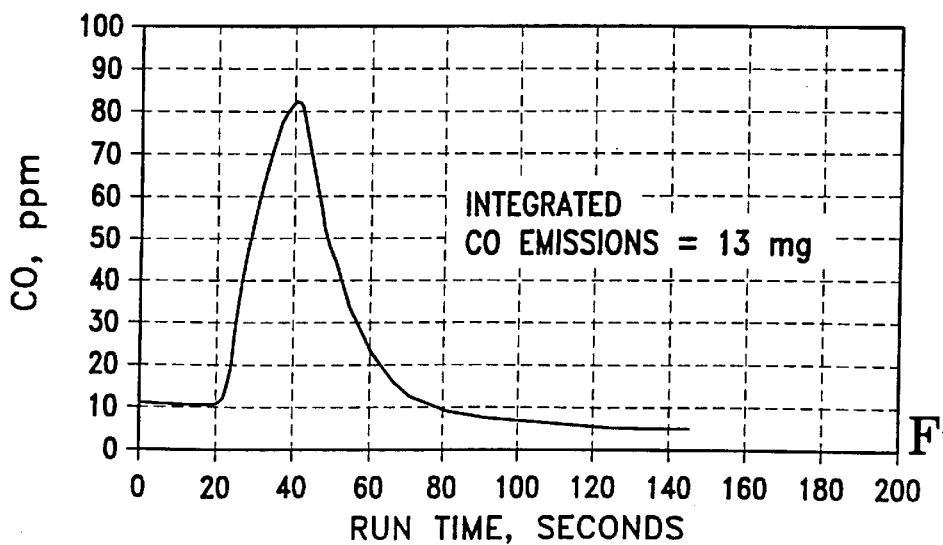

The results of this test are shown in FIGS. 11a through 11c. FIG. 11a shows that the catalyst substrate temperature increased to a maximum of about 900° C. when the fuel was initially injected and then returned to its steady-state operating temperature of about 800° C. FIG. 11a also shows higher temperature for the combusted gas mixture at both the outlet of the catalyst structure and at the outlet of the combustion reactor.

FIGS. 11b and 11c show the integrated total emissions for the UHCs and CO respectively. Under these operating condition, the total amount of UHCs was 4.2 mg and the total amount of CO was approximately 13 mg. These results show that by electrically preheating the catalyst, the emissions during start-up conditions can be substantially reduced. More specifically, the start-up conditions used in Example 2 resulted in a 99.7% reduction in the UHC emissions and a 84% reduction of the CO emissions. Based on these results, it is clear that the use of an EHC unit in the start-up of a gas turbine can substantially reduce the total integrated emissions during start-up.

Example 3

This example illustrates that the exact sequence and timing of fuel on versus electrical power off is important to the total reduction of the emissions. If power is turned off too soon, before the fuel reaction rate is fast enough, then the catalyst temperature may decrease and the initiation of homogeneous combustion after the catalyst will be delayed. In addition, significant fuel will escape the combustion chamber and appear as undesired emissions. If the electrical power is turned off too late, then the catalyst may overheat and be damaged.

EHC Unit Preparation:

The catalyst and test systems used in Example 3 are similar to those described in Examples 1 and 2. In this test, the fuel used was natural gas consisting mainly of methane with minor constituents of higher hydrocarbons. The EHC unit was a two foil, spirally wound EHC unit using one flat foil and one corrugated foil. The corrugated foil in this test was formed into a herringbone pattern with a corrugation height of 1.20 mm and a peak to peak period of 2 mm. The herringbone pattern had channel lengths of 20 mm and a channel angle of 6. The corrugated foil in this test had one side coated with the catalyst, unlike the previous test, where the flat foil was coated with the catalyst. The washcoat preparation and application was the same as that described in Example 1.

Start-up Test Conditions:

The following conditions were used to test the EHC unit in this example:

1. The air flow through the combustion reactor was set to 240 SLPM.

2. The air was preheated to 450° C.

3. Electrical power was applied to the EHC unit to achieve a catalyst substrate temperature of 950° C.

4. Natural gas fuel was supplied at a flow rate of 7.9 g/min. The fuel was injected at the time 18 seconds.

5. Fuel was turned on and the EHC power turned off after a selected time interval after the fuel was turned on.

6. The temperatures of the catalyst substrate and combusted gas mixture and the emission were monitored throughout this test. Table 3 and FIG. 12 contain the data from this test.

TABLE 3

| Run | Delay from Fuel on to EHC Power Off (sec) | Integrated Emissions UHC (mg) | CO (mg) | T Outlet Wall at Fuel on to CAT | T Outlet Wall Min During Start |
|---|---|---|---|---|---|
| 1 | No EHC power | 4200 | 49 | 550 | 550 |
| 2 | 15 seconds | 3500 | 40 | 930 | 810 |
| 3 | 18 seconds | 110 | 22 | 930 | 900 |
| 4 | 21 seconds | 20 | 23 | 930 | 930 |

Figure 12:
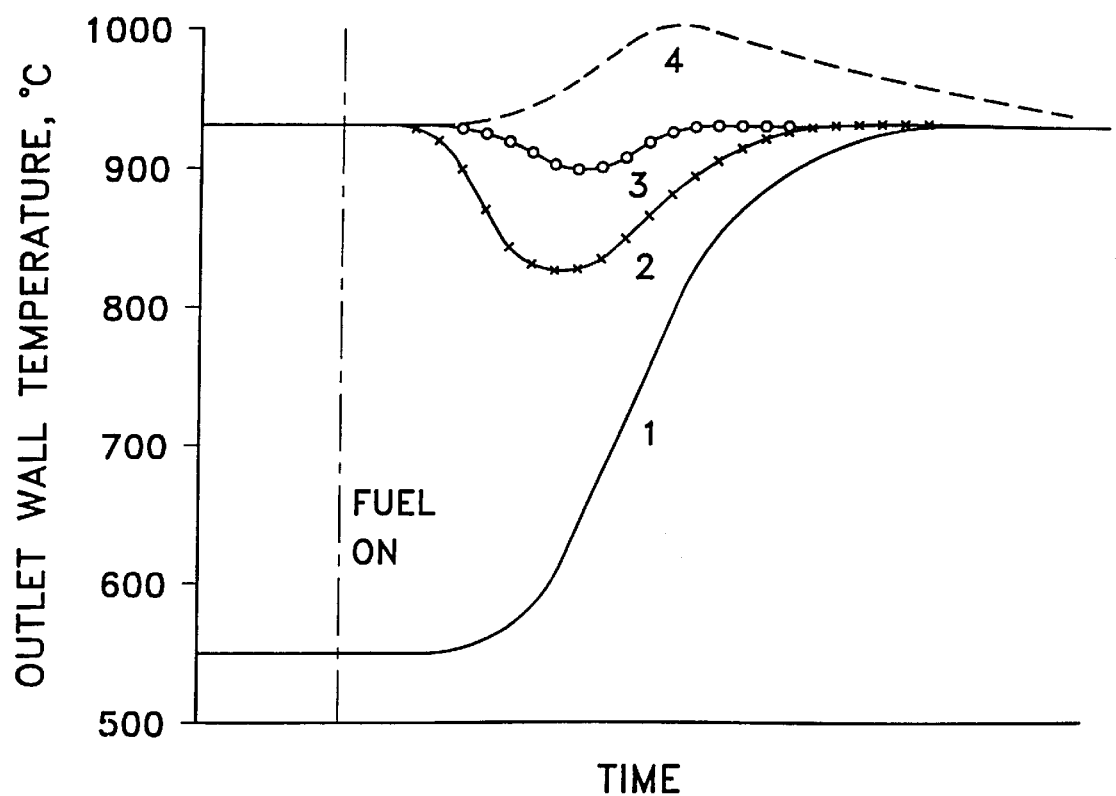
FIG. 12 shows the effect of varying the time of electrical power input to an EHC after fuel is introduced on the catalyst structure outlet wall temperature.

These data demonstrate that there is a threshold period of time that the power to an EHC unit 10 should be left on that results in a significant reduction in undesired emissions. Emissions of UHC, during the start transient, can be reduced from 4200 mg to 20 mg and CO from 49 to 23 by increasing the time that EHC power is kept on after fuel is turned on. Because of the IHE structure of the catalyst, only a portion of the fuel is combusted in the catalyst. If the temperature exiting the catalyst is too low to initiate homogeneous combustion, then this unburned fuel will exit the combustor and be emitted to the atmosphere. This is clearly the case in run 1 where the catalyst substrate temperature was only 550° C. and required a very long time to be heated by the reacting fuel to its steady-state temperature as shown in FIG. 12. Applying EHC power raises the catalyst substrate temperature to its steady-state value, in this example 930° C. However, if the EHC power is removed too soon as in runs 2 and 3, then the catalyst substrate temperature will decrease, not providing the required catalyst outlet temperature. If the EHC power is kept on for a long time after the fuel is turned on and begins to react on the catalyst, then the catalyst temperature may rise far above the steady-state temperature. These data clearly show that there is an optimum time for which EHC power should be maintained after fuel flow is started for achieving minimum emissions. In addition, these results show that using a control system to modulate the EHC power to maintain a relatively constant catalyst substrate temperature is a preferred operating mode.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for start-up of a gas turbine engine employing a hydrocarbonaceous fuel source and a monolithic catalyst structure in which at least an initial portion is electrically heated to supply combustion gas to the gas turbine which comprises, in sequential fashion, the steps of:
   a. applying electrical power to the electrically-heated portion of the catalyst structure to heat the catalyst structure to within about 100° C. of the temperature obtained when the catalyst structure is combusting the fuel at steady-state conditions;
   b. contacting the preheated catalyst structure with a mixture of hydrocarbonaceous fuel and an oxygen-containing gas which will undergo essentially complete combustion at the steady-state conditions selected; and
   c. turning off the electrical power when the heat of reaction released by the reaction of the fuel and oxygen on the catalyst is sufficient to maintain the catalyst at steady-state conditions.

2. The process of claim 1 wherein the temperature of the catalyst structure is monitored and the electrical power to heat the catalyst structure is modulated in response to variances in the temperature of the catalyst structure above or below the steady-state temperature.

3. The process of claim 2 wherein the temperature variance in the steady-state temperature of the catalyst structure which causes the electrical power to be modulated is less than 100° C. above or below the steady-state temperature.

4. A method for start-up of a gas turbine engine powered by combusting a hydrocarbonaceous fuel in an oxygen-containing gas mixture, said gas turbine engine employing a monolithic, electrically-heated catalyst structure being comprised of heat resistant, thin metal foils, at least one of which is corrugated, and said foils being stacked together to form a plurality of adjacent longitudinal channels for passage of said fuel and oxygen-containing gas mixture wherein at least a portion of the channels is coated with a catalyst and the interior surface of the remaining channels is not coated with catalyst and at least some portions of the foils are coated with an electrically-insulative coating on at least one side, said foils being connected to electrode and to each other to form an electrical circuit whereby, upon application of electrical power having a predetermined voltage, a current will flow through some portion of the metal foils thereby heating said foils, said method comprising the steps of:
   a. applying electrical power to said catalyst structure to heat said catalyst structure to within about 100° C. of the steady-state operating temperature of said catalyst structure;
   b. contacting said preheated catalyst structure with said hydrocarbonaceous fuel/oxygen-containing gas mixture; and
   c. terminating said electrical power when any one of the following predetermined condition are met:
      i. the heat of reaction released by the reaction of the fuel and oxygen on said catalyst structure is sufficient to maintain said catalyst structure at its steady-state operating temperature, or
      ii. the fuel/oxygen-containing mixture at the combustor outlet reaches a predetermined temperature limit,
      iii. a predetermined period of time has elapsed since said contacting step was initiated, or
      iv. the partially combusted fuel oxygen-containing mixture at the catalyst exit reaches a predetermined temperature.

5. The process of claim 4, wherein said electrical power is modulated to maintain said catalyst structure at its steady-state operation temperature.

6. The process of claim 5, wherein said catalyst structure steady-state operating temperature is in the range of about 800° C. to about 1000° C.

7. The process of claim 5, wherein said electrical power is modulated during the first 5 to 30 seconds after the catalyst structure reaches steady-state conditions.

8. The process of claim 7, wherein said electrical power is terminated when the catalyst structure temperature rises to a predetermined set point.

9. The process of claim 4, wherein in said terminating step, the fuel/oxygen-containing mixture at the combustor outlet reaches about 25 to 100° C. below the steady-state combustor outlet temperature.

* * * * *